(12) United States Patent
Agarwal et al.

(10) Patent No.: US 9,767,197 B1
(45) Date of Patent: Sep. 19, 2017

(54) DATACENTER OPERATIONS USING SEARCH AND ANALYTICS

(71) Applicant: VMWARE, INC., Palo Alto, CA (US)

(72) Inventors: Shiv Agarwal, Milpitas, CA (US); Apurv Gupta, Bangalore (IN); Mukul Gupta, San Jose, CA (US); Abhijit Sharma, Maharashtra (IN); Rohit Toshniwal, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 161 days.

(21) Appl. No.: 14/464,579

(22) Filed: Aug. 20, 2014

(51) Int. Cl.
*G06F 17/30* (2006.01)

(52) U.S. Cl.
CPC .............................. *G06F 17/30864* (2013.01)

(58) Field of Classification Search
CPC combination set(s) only.
See application file for complete search history.

(56) References Cited

U.S. PATENT DOCUMENTS

| | | | |
|---|---|---|---|
| 4,958,285 A * | 9/1990 | Tominaga | G06F 17/274 704/8 |
| 6,433,802 B1 * | 8/2002 | Ladd | G06F 8/34 715/762 |
| 6,483,812 B1 | 11/2002 | Prorock et al. | |
| 6,725,227 B1 * | 4/2004 | Li | G06F 17/30884 |
| 7,096,219 B1 * | 8/2006 | Karch | G06F 21/316 |
| 7,788,587 B2 | 8/2010 | Michelman et al. | |
| 7,992,102 B1 | 8/2011 | De Angelo et al. | |
| 8,230,339 B2 | 7/2012 | Watanabe et al. | |
| 8,266,550 B1 | 9/2012 | Cleron et al. | |
| 8,443,293 B2 | 5/2013 | Soerensen et al. | |
| 9,015,730 B1 | 4/2015 | Allen et al. | |
| 2002/0186827 A1 * | 12/2002 | Griffiths | H04M 3/436 379/207.02 |
| 2003/0184580 A1 | 10/2003 | Kodosky et al. | |
| 2006/0052998 A1 | 3/2006 | Michelman | |
| 2007/0274239 A1 * | 11/2007 | Nguyen | H04L 49/3054 370/282 |
| 2008/0059487 A1 * | 3/2008 | Mi | G06F 17/30327 |
| 2008/0195677 A1 | 8/2008 | Sudhakar et al. | |
| 2008/0288637 A1 * | 11/2008 | Nagaraja | G06F 17/30575 709/225 |
| 2009/0144148 A1 | 6/2009 | Jung et al. | |
| 2009/0171654 A1 * | 7/2009 | Spain | G06F 17/2872 704/7 |
| 2009/0216572 A1 * | 8/2009 | Anderson | G06Q 10/02 705/5 |
| 2009/0276771 A1 | 11/2009 | Nickolov et al. | |
| 2010/0064225 A1 * | 3/2010 | Cunningham | H04L 41/22 715/736 |

(Continued)

*Primary Examiner* — Etienne Leroux

(57) ABSTRACT

A datacenter management system uses data collection proxies to collect performance data and configuration data for different physical and virtual entities in the datacenter. A schema is used to represent the different entities, entity relationships, and entity properties in the datacenter. A search engine identifies the intent of a natural language based search query based on the schema and a datacenter dictionary. The search engine then searches the data based on the search query intent. A dictionary manager converts both periodic and aperiodic data into a time series. This allows the search engine to operate as a time machine identifying both performance data and configuration data for any selectable time period.

22 Claims, 14 Drawing Sheets

(56) References Cited

U.S. PATENT DOCUMENTS

| | | | |
|---|---|---|---|
| 2010/0180092 A1* | 7/2010 | Rajaa | G06F 17/30067 711/162 |
| 2010/0257457 A1 | 10/2010 | De Goes | |
| 2011/0047466 A1 | 2/2011 | Michelman | |
| 2011/0295783 A1* | 12/2011 | Zhao | G06F 17/30702 706/12 |
| 2012/0020581 A1 | 1/2012 | Zarom | |
| 2012/0110046 A1* | 5/2012 | Oba | G06F 17/30235 707/829 |
| 2012/0303325 A1* | 11/2012 | DePue | G06F 11/3433 702/186 |
| 2013/0124712 A1* | 5/2013 | Parker | H04L 41/5038 709/224 |
| 2014/0369229 A1 | 12/2014 | Martineau | |

\* cited by examiner

DATACENTER OPERATIONS USING SEARCH AND ANALYTICS

BACKGROUND

Modern datacenters may include physical and virtual entities. Examples of physical entities may include application servers, storage servers, load balancers, network interface cards (NICs), firewalls, switches, routers, etc. Almost any of these physical entities can be virtualized as software entities, such as virtual machines (VM), virtual firewalls, virtual switches, virtual routers, virtual extensible local area networks (VXLANs), etc.

Virtual entities increase the complexities of monitoring, troubleshooting, and visualizing these dynamically configurable networks. Existing systems may only monitor and collect data for a subset of physical or virtual components within the datacenter. Existing systems also may not be able to understand these new architectures, entities, and the relationships between these entities. Thus, present system may not effectively monitor or visualize the physical and virtual entity configurations within modern datacenters.

DETAILED DESCRIPTION

A management system uses time-series based modeling of entities and properties (Objects) to effectively capture the evolving state of a datacenter. Models represent physical, virtual, and logical entities and entity relationships for different periodic and aperiodic events. The management system captures different performance data and configuration data associated with the entities. The performance data measures performance of different entities, such as central processing unit (CPU) utilization, memory utilization, packet drops, etc. The configuration data identifies configurations within entities, such as the number of CPUs assigned to a virtual machine or the rules used by a physical or virtual firewall.

A natural language based search engine operates within the context of the datacenter domain and identifies the intent of search queries. The search engine uses the models to more efficiently search and visualize current and historical events within the datacenter. The search engine also includes a collaboration feature that enables users to more effectively exchange datacenter information.

Figure 1:
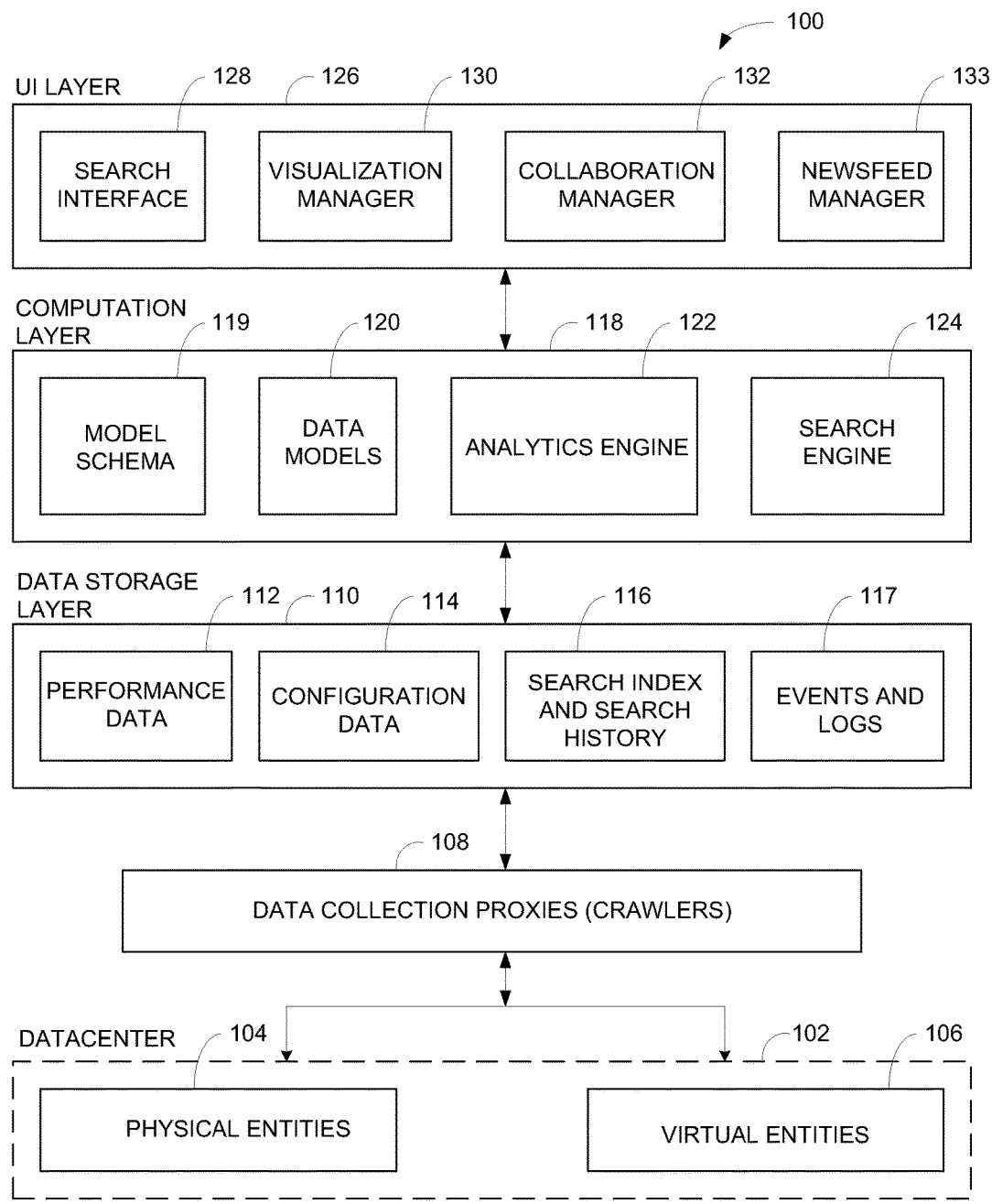
FIG. 1 depicts an example datacenter management system.

FIG. 1 depicts an example management system 100. A datacenter 102 may include a variety of different physical entities 104 and virtual entities 106. Physical entities 104 may comprise any physical devices used for processing, storing, and/or exchanging data. A few examples of physical entities 104 include application servers, storage servers, load balancers, network interface cards (NICs), firewalls, switches, routers, client devices, etc. Virtual entities 106 may include any entities virtualized in software, such as virtual machines (VM), virtual firewalls (VFW), virtual switches, virtual routers, virtual extensible local area networks (VXLANs), etc. Datacenter 102 also may include different logical entity relationships, such as layer 2 and layer 3 logical networks. These are just examples of an almost limitless number of different physical and virtual entities and relationships that may exist within datacenter 102.

Data collection proxies 108 are alternatively referred to as crawlers and collect and store data from physical entities 104 and virtual entities 106 in a data storage layer 110. The data may include performance data 112, configuration or change data 114, and event and log data, such as alerts, problems, faults, etc. Management system 100 also may store search indexes and search histories 116 from search queries.

Performance data 104 may be associated with the performance of any entity or combination of entities in datacenter 102. Examples of performance data 112 include CPU utilization, packet processing, packet transmission and reception drops, memory utilization, etc. Examples of configuration data 114 include any information associated with the configuration of any entity or combination of entities in datacenter 102. Examples of configuration data 114 include a number of CPUs assigned to a VM, network and communication paths in a VXLAN, rules in a physical or virtual firewall, NICs connected to a VM, changes in system configurations, etc. These are just a few examples of almost limitless types of performance and configuration data.

Data collection proxies 108 may periodically collect performance data 112 and/or configuration data 114. For example, proxies 108 may monitor CPU utilization for a VM every ten minutes and save the utilization values as part of performance data 112. Data collection proxies 108 may aperiodically collect other performance data 112 and/or configuration data 114. For example, collection proxies 108 may identify the number of CPUs assigned to a VM as part of configuration data 114.

Data collection proxies 108 may include any combination of existing and customized programs for monitoring and extracting data from entities 104 and 106. For example, physical entities 104, such as routers and switches, may include application program interfaces (APIs) for extracting CPU utilization, memory utilization, packet drops, routing tables, logged data, address resolution protocol (ARP) tables, etc.

A computation layer 118 uses the data in storage layer 110 to provide information to a user interface layer 126. A model schema 119 identifies the general relationships and properties associated with entities in datacenter 102. Data models 120 represent the particular performance data 112 and configuration data 114 associated with the entities in datacenter 102. For example, CPU and memory utilization, logical and physical connections, end-to-end communication paths, logical layer 2 and layer 3 network connections, application topologies, VXLAN topologies, port groups, etc. Some data models 120 are manually created and other data models 120 may be dynamically generated.

Analytics engine 122 automatically monitors and identifies data and other events. Analytics engine 122 may include event detectors that identify significant events in datacenter 102. For example, the event detector may identify configuration changes and performance data representing the performance status of datacenter 102. Analytics engine 122 may also operate as outlier detector that identifies events that are outside normal operating levels. For example, an outlier detector may identify CPU utilization above a particular threshold level. Analytics engine 122 may also operate as a problem detector that identifies problems in datacenter 102. For example, the problem detector may identify large packet losses or configuration mismatches between entities.

Search engine 124 conducts natural language searches within datacenter 102 and identifies a search query intent based on model schema 119 and a datacenter dictionary. Instead of operating just on keywords, search engine 124 also understands search query phrases that may be part natural language and part expression. This provides richer intent expression, greater ease of use, and applies well to the datacenter problem domain. For example, a search term such as TROUBLESHOOT may cause search engine 124 to search problem data generated by analytics engine 122.

Search engine 124 may operate as a time machine executing queries for specified time intervals. For example, a user may enter a search term requesting search engine 124 to show all configuration changes for a specified network over the past two days. In another example, the user may enter a search term requesting CPU usage for a host device over the last two days. Data models 120 may be configured in a unique time series format that enables search engine 124 to quickly identify events for any selectable time period.

Data models 120 may include identifiers associated with different physical and virtual entities, networks, performance data, and/or configuration data. Search engine 124 may search for data or provide search suggestions based on data models 120. For example, one of data models 120 for a virtual firewall may contain firewall rules. A user may enter the search term RULES. Search engine 124 may identify the firewall rules in the model or provide a suggestion for displaying the rules identified in the virtual firewall model.

User interface layer 126 includes a search interface 128 for receiving search queries and displaying search results. Search interface 128 may receive natural language based expressions for search engine 124 and display the results from search engine 124 in a textual and/or graphical format. A visualization manager 130 generates topology diagrams representing different entities and network configurations within the datacenter.

A collaboration manager 132 captures particular states of the datacenter and enables different users to view, share, and manipulate the captured states. For example, a first user may identify a network state where a large number of packets are being dropped. The first user may direct collaboration manager 132 to capture that state of the network and identify a second user for sharing the captured state. The second user can access the captured network state and perform additional analysis.

A newsfeed manager 133 identifies and displays events of particular interest to the user. For example, newsfeed manager 133 may identify a search index and/or search history 116 for a user currently logged on to the system. For example, a user may have previously performed search queries for a particular logical network. When the user logs in, newsfeed manager 133 may automatically display events associated with the previously queried logical network.

Figure 2A:
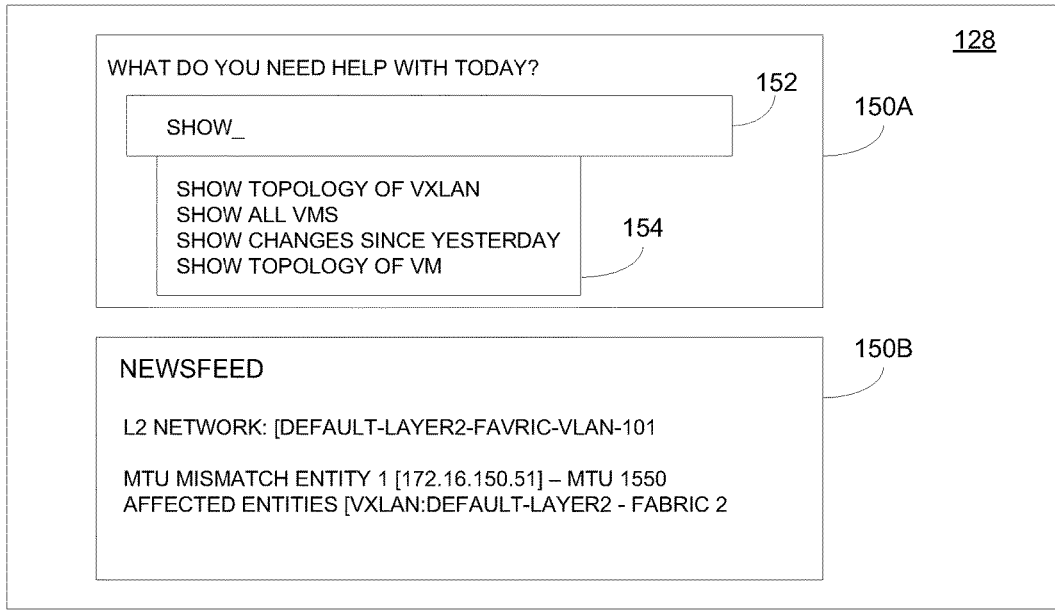
FIGS. 2A and 2B depict example information displayed by the management system.

FIG. 2A depicts example screen sections 150A and 150B displayed within a computer screen by search interface 128. Referring to FIGS. 1 and 2A, analytics engine 122 monitors and identifies events associated with the datacenter models. The search engine operates in conjunction with the models and associated data to provide search suggestions and search results corresponding with the datacenter information.

For example, the user may enter the search term SHOW into search field 152. Search interface 128 may submit the search term to the search engine and display received back suggestions in drop down menu 154. For example, search interface 128 may display suggestions for showing a topology for VXLAN, showing all VMs, showing changes in a network since yesterday, or showing a topology for a VM. In another example, the user may enter the search term V into search field 152. User interface may display suggestions in drop down menu 154, such as virtual, VXLAN, VM, etc. The suggestions may be based on the models and the names of entities identified in the models or may be based on a datacenter library that may include names of datacenter entities.

The suggestions and search results also may be based on search history 116. For example, search engine 124 may store previous search queries and provide at least some suggestions that are weighted based on the most frequently requested networks, entities, and data.

Search interface 128 may display newsfeed data from newsfeed manager 133 within screen section 150B. The newsfeed data in screen section 150B is searchable since the events, anomalies, and/or changes are first class objects. In this example, the newsfeed data identifies a layer 2 network and identifies a maximum transmission unit (MTU) mismatch within a VXLAN. Newsfeed manager 133 may automatically generate the data in screen section 150B based on user configuration setting.

Figure 2B:
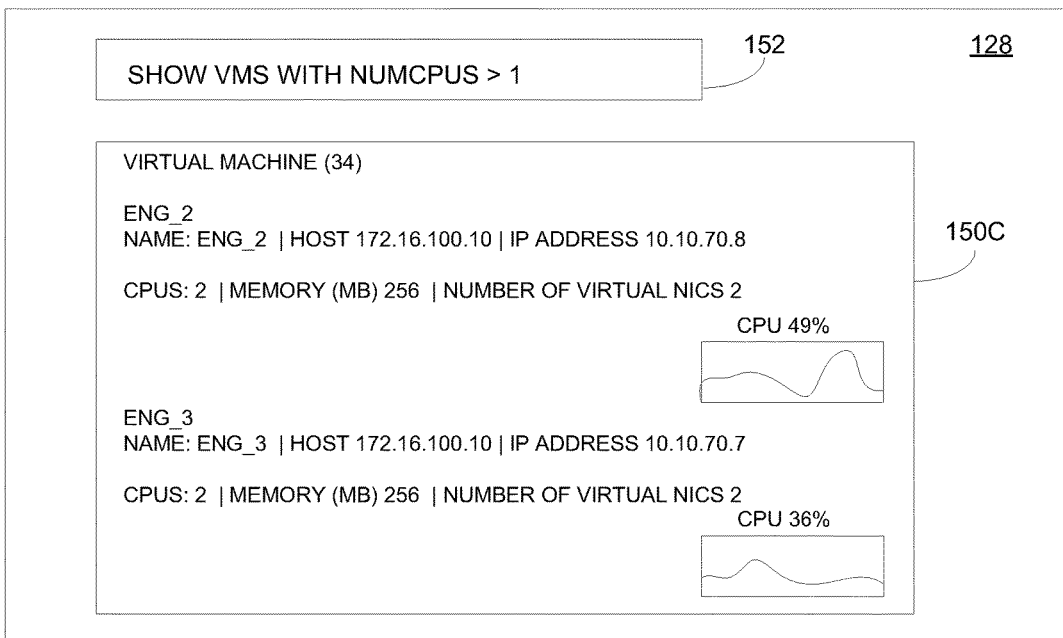

FIG. 2B depicts an example screen section 150C displayed within a computer screen by the search interface 128. In this example, the user enters the search term: SHOW VMS WITH NUMCPUS>1. Search engine 124 searches VMs models for any configuration data indicating more than one CPU. Search interface 128 displays the names of any identified VMs, number of CPUs, the host device IP address, memory capacity, and number of virtual NICs connected to the VM. Search interface 128 also may display a graph showing the percentage of CPU bandwidth used by the different virtual machines.

Figure 3:
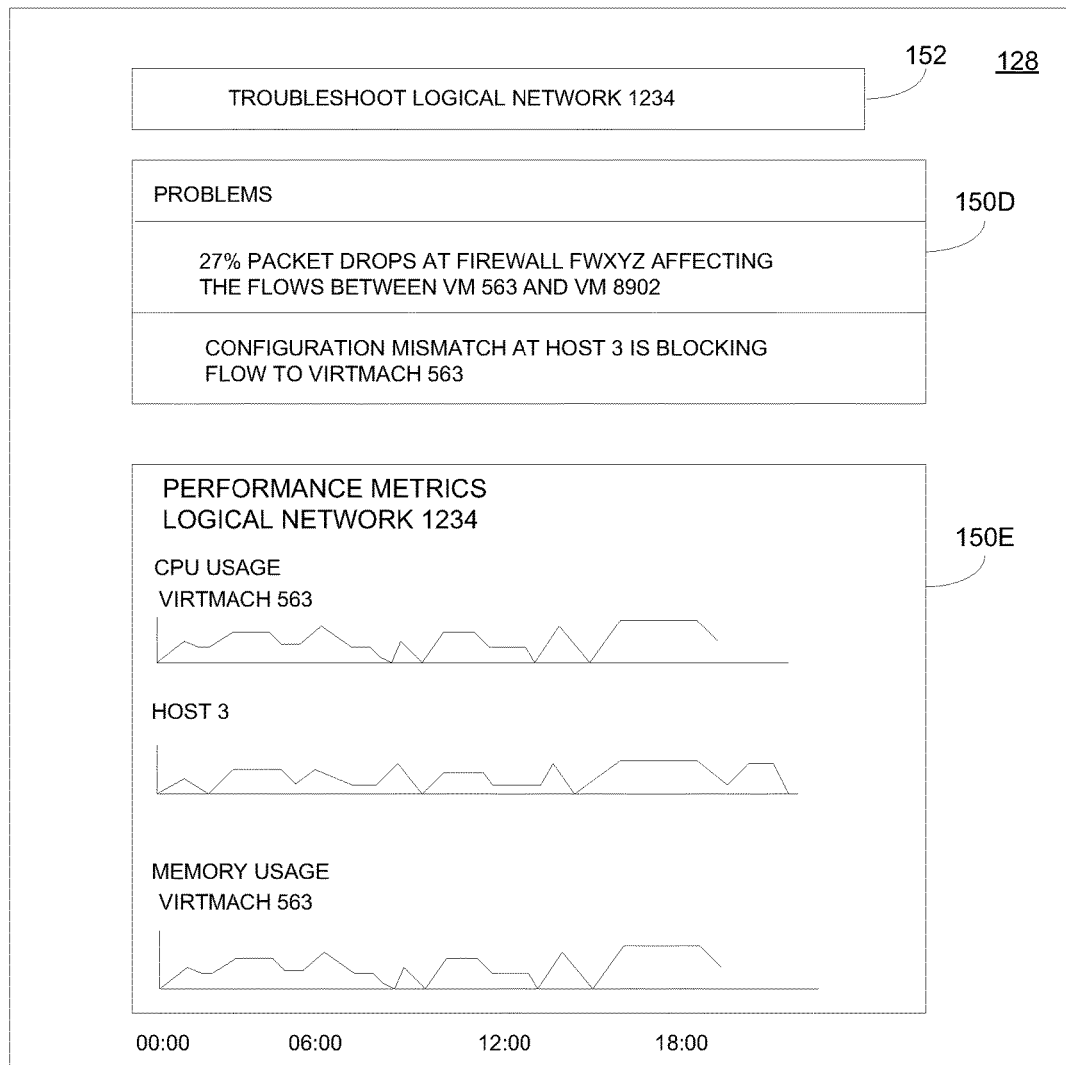
FIG. 3 depicts example information displayed by the management system.

FIG. 3 depicts examples of other information displayed by search interface 128. Referring to FIGS. 1 and 3, in this example a user enters the search term TROUBLESHOOT LOGICAL NETWORK 1234 into search field 152. Logical network 1234 was previously configured by a user and may include a variety of physical and virtual entities. Search interface 128 sends the search term to search engine 124.

Search engine 124 uses the model schema 119 in FIG. 1 to identify the relationships and properties of a logical network and then searches data models 120 for problem data identified by analytics engine 122 and associated with any of the entities of the logical network 1234. For example, search engine 124 may identify a firewall XYZ in logical network 1234 dropping 27% of the packets transmitted between VM 563 and VM 8902. Search engine 124 may also identify a configuration mismatch for a host device HOST 3 in logical network 1234 that blocks packets to VM 563.

A screen section 150E shows performance data associated with logical network 1234. In this example, the performance data includes CPU usage and memory usage for two entities VM 563 and Host 3 within logical network 1234. Visualization manager 130 may display different information and visualize the information differently based on the search query intent and on the search results. For example, the intent of the search query in search field 152 is to identify problems in logical network 1234. Visualization manager 130 may display problem data discovered in the search results in a larger screen section 150 than other data. If no problem data is discovered, visualization manager 130 may display performance metrics, or other data, that could reflect potential network problems.

Figure 4:
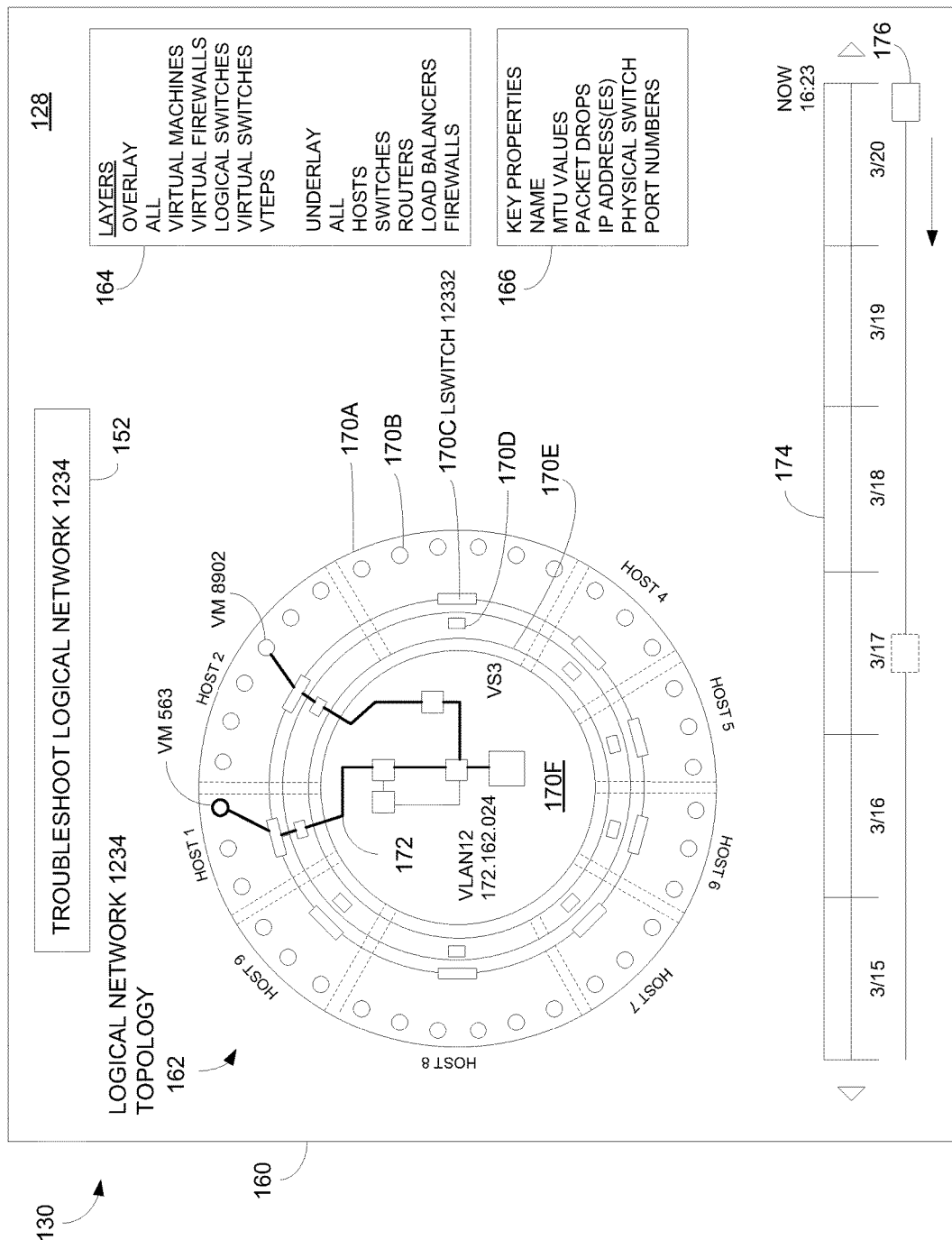
FIG. 4 depicts a topology displayed by the management system.

FIG. 4 depicts an example topology displayed by search interface 128. Referring to FIGS. 1 and 4, a user may enter the search term TROUBLESHOOT LOGICAL NETWORK 1234 into search field 152. Search interface 128 submits the search term to search engine 124. Search engine 124 uses models 199 and 120 to identify the entities and relationships associated with logical network 1234. For example, data models 120 may include a graph model that identifies all of the entities and relationships within logical network 1234. Visualization manager 130 uses the entity and relationship information to display topology 162.

In one example, topology 162 comprises multiple circular layers 170 that represent different physical and/or logical entities within logical network 1234. Underlay layers 170 refer to the physical network serving an overlay layer 170. For example, underlay layer 170A is the network that delivers the packets from multiple overlay networks between hosts and may include physical switches and routers. Overlay layer 170B includes circles displayed over layer 170A representing the VMs configured on the hosts in layer 170A.

A logical switch layer 170C is displayed over host layer 170A and shows the logical switches connecting the VMs in layer 170B to other network entities. A layer 170D shows tunnel endpoints and a layer 170E identifies virtual switches (VS) within logical network 1234. A central circular layer 170F displays physical network entities connecting the hosts in layer 170A. Visualization manager 130 displays boxes in layer 170F that represent different physical switches and routers that form logical network 1234. Visualization manager 130 also displays lines 172 that show the logical and physical connections between the different virtual and physical entities in logical network 1234.

Search interface 128 may detect selections of different entities within topology 162 and display associated information. For example, search interface 128 may detect a mouse click on VM 563 and display the associated properties, such as number of CPUs, memory allocation, logical network relationships, NICs, etc. In another example, the user may click on two different VMs and search interface 128 may automatically display the logical and physical network topology containing the two selected VMs.

As explained above, search engine 124 may identify anomalies or problems within logical network 1234. Visualization manager 130 may display the identified anomalies or problems within topology 162. For example, visualization manager 130 may highlight or flash the circle in layer 170B representing a VM that is using a large amount of CPU resources or may highlight or flash one of the boxes in layer 170E representing a firewall that is dropping a large percentage of packets.

Search interface 128 may display a screen section 164 that allows the user to select the different layers 170 displayed in topology 162. For example, a first set of user selectable layers may include VMs, virtual firewalls, logical switches, virtual switches, and VXLAN tunnel end points (VTEPs). A second set of user selectable layers 170 may include physical hosts, switches, routers, load balancers, and firewalls.

A screen section 166 allows the user to select which properties are displayed within topology 162. For example, search interface 128 may selectively display MTU values, packet drops, IP addresses, physical switch port numbers, etc. for entities in logical network 1234 based on associated properties selected in screen section 166.

A slider 174 controls time periods associated with topology 162. For example, a slider knob 176 may currently be positioned underneath the date 3/20. Search interface 128 displays topology 162 for logical network 1234 on March 20th. The user may drag slider knob 176 from underneath the date 3/20 back in time to a position underneath date 3/17. Search interface 128 accesses previously captured data for logical network 1234 and displays the topology of logical network 123 for March 17th. For example, a VM 8902 may have been configured on a different host on March, 17th. Search interface 128 would display a different topology for logical network 1234 with VM 8902 located on the different host.

Moving slider knob 170 further to the left shows even earlier states of logical network 1234 and moving slider knob 170 further to the right shows later states for logical network 1234. Moving slider knob to the farthest right position shows the current state of logical network 1234. The user can also change the time period for logical network 1234 via search field 152. For example, the user can enter the search term TROUBLESHOOT LOGICAL NETWORK 1234 ON 3/17.

Search engine 124 identifies network states based on user intent. For example, based on the search term TROUBLESHOOT LOGICAL NETWORK 1234, search engine 124 predicts the user intent as wanting to view the entities in logical network 1234 with the latest problems or anomalies. If the user enters the search term TROUBLESHOOT VM 563, visualization manager 130 predicts the intent of the user as viewing text and graphs associated with the performance of VM 563.

Figure 5:
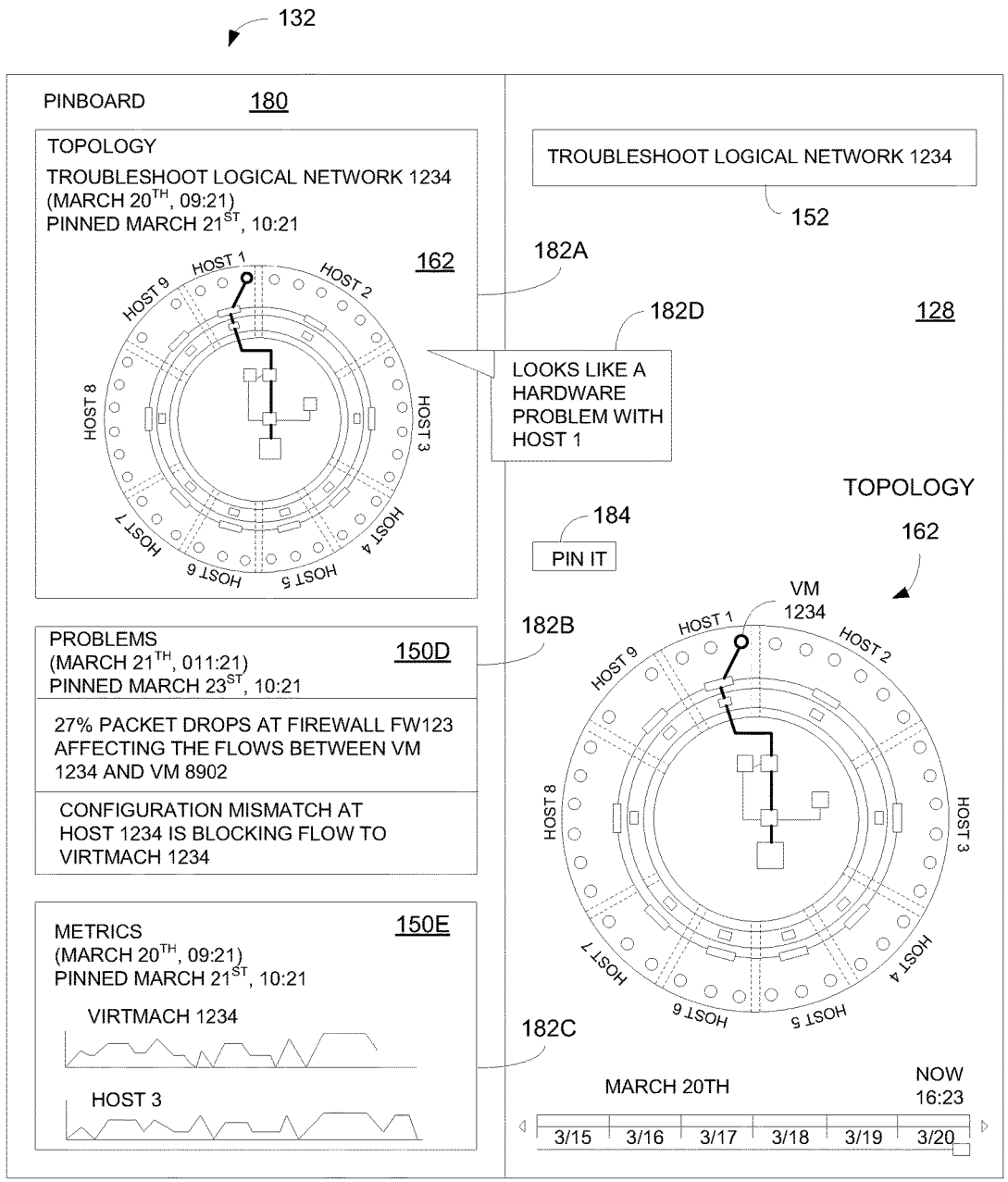
FIG. 5 depicts example collaboration interface provided by the management system.

FIG. 5 depicts an example pinboard displayed in search interface 128. Referring to FIGS. 1 and 5, a user may select any of the screen sections described above and select an icon 184. Collaboration manager 132 attaches the information associated with the selected screen section to a pinboard 180. Collaboration manager 132 can then distribute the contents in pinboard 180 to different selected users.

For example, a first user may initiate a search query in search field 152 to troubleshoot logical network 1234. The first user may identify an interesting data related to logical network 1234 for March 20th at 09:21. The user selects topology 162 by clicking on icon 184. Once selected, collaboration manager 132 inserts the data associated with topology 162 into section 182A of pinboard 180 and saves the associated data in a collaboration database.

The first user may select any combination of visualizations and/or data from any combination of screen sections. For example, the user also may select pin icons associated with screen sections 150D and 150E in FIG. 3. Collaboration manager 132 moves the data for the selected screen sections 150D into section 182B of pinboard 180 and moves the data for screen section 152E into section 182C of pinboard 180 and stores the associated data into the collaboration database. The first use may also generate and pin comments 182D to pinboard 180. For example, the first user may generate comment 182D that points out a potential problem with Host 1. Collaboration manager 132 stores comment 182D with the other data in the collaboration database.

The first user can share pinboard 180 with other users. For example, the first user may identify one or more names or Internet addresses of other datacenter users. Collaboration manager 132 sends the identified users links to the collaboration data containing pinboard 180. Collaboration manager 132 displays pinboard 180 in response the other users selecting the link. The other users can then start troubleshooting the datacenter from the same state pinned by the first user.

Search interface 128 and collaboration manager 132 provide more effective troubleshooting and data mining by allowing users to visually search through datacenter topologies for different selectable time periods and share identified states with other users.

Figure 6:
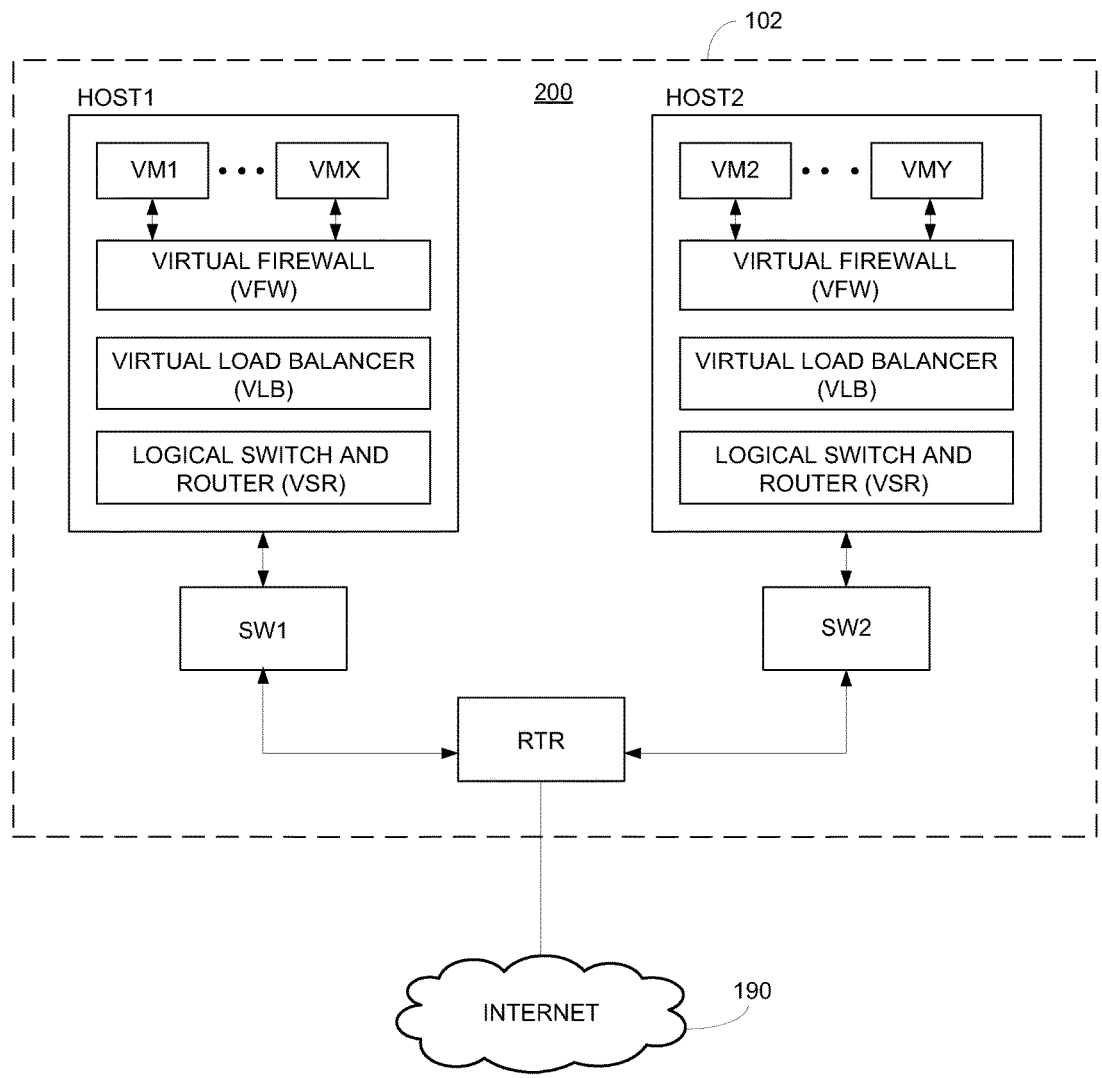
FIG. 6 depicts an example datacenter network.

FIG. 6 shows one example network 200 configured within datacenter 102. In the following example, network 200 refers to any combination of topologies, configurations, communication paths, virtual networks, virtual extensible local area networks (VXLANs), logical networks, or the like, or any other combination of physical and/or virtual entities that may be configured within datacenter 102.

In this example, network 200 includes a first host (HOST1) configured for operating a first virtual machine (VM1), a virtual firewall (VFW), a virtual load balancer (VLB), and a logical switch and router (VSR). A second host (HOST2) is configured for operating a second virtual machine (VM2), a virtual firewall (VFW), a virtual load balancer (VLB), and a logical switch and router (VSR). A first physical switch (SW1) connects HOST1 to a physical router (RTR) and a second physical switch (SW2) connects HOST2 to RTR. The RTR is connected to other networks and devices via Internet 190.

In one example, HOST1, HOST2, SW1, SW2, and RTR are physical hardware entities. The entities VM1, VFW, VLB, and VSR are software entities operating on HOST1, and the entities VM2, VFW, VLB, and VSR are software entities operating on HOST2. Configuring physical and virtual entities into a network 200 are known to those skilled in the art and are therefore not described in further detail.

Models

Different schemas are used for modeling entities in the datacenter. The general relationships and properties classifying networks, and entities within networks, are referred to as models, model schemas, or schemas. The specific port connections, relationships, performance data, configuration data, and property values for the configured networks and network entities are referred to as data, data models, data model schemas, and/or storage schemas.

Figure 7:
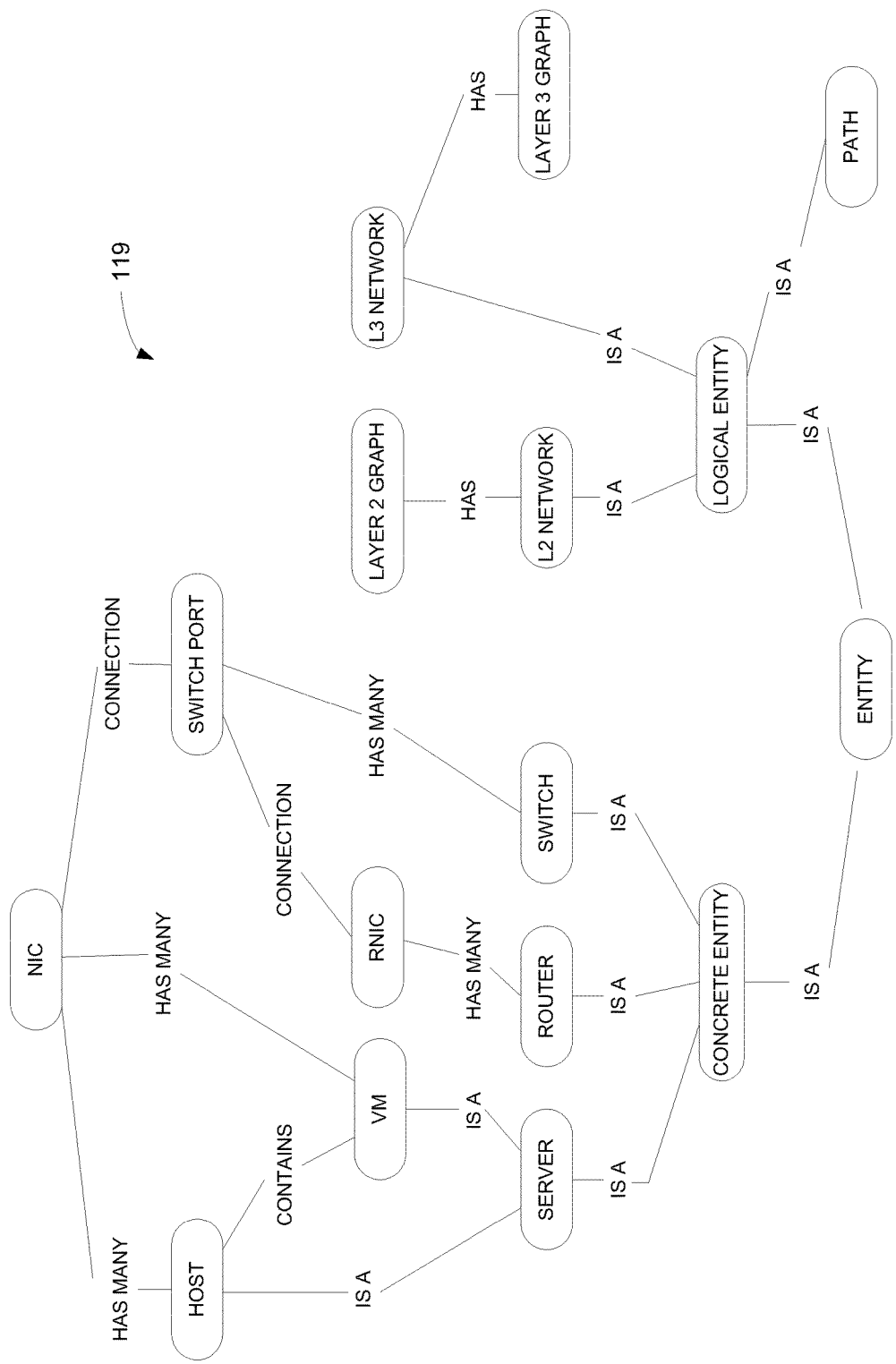
FIG. 7 depicts an example model/schema used by the management system.

FIG. 7 shows one example of a model/schema 119. Model/schema 119 is one example of an object relational graph used in the datacenter for representing entities in the data center and representing the general relationships between the entities in the datacenter. This is just one example of multiple different model schemas used in the datacenter.

In one example, an object representing a datacenter entity may be classified as a concrete entity or a logical entity. The concrete entity may be further classified as a server, router, or switch. The object for the server may be classified as either a host or a VM. An object for the router may be identified as having multiple remote direct memory access (RDMA) network interface cards (RNIC). An object for the switch may be classified as having multiple switch ports.

An object for the host may have the property of containing VMs and having multiple network interface cards (NICs). An object for the VM may have the property of having multiple NICs. The object for the RNIC may have a connection relationship with a switch port. The object for the switch port may have a connection relationship with the NIC.

The object for the logical entity may be classified as being a L2 network, a L3 network, or a network path. The object for the L2 network may have a layer 2 graph that further identifies the nodes and edges for connecting to other entities in the datacenter. Attributes may be associated with the graph nodes and edge connections, such as transmission speed, etc. The object for the L3 network may have a layer 3 graph that further identifies the nodes and edges for connecting to other entities in the L3 network.

Thus, model schema 119 may include:
entities {concrete entity, server, router, switch, host, VM, switch port, VNIC, logical entity, L2 Network, L3 network, layer 2 graph, layer 3 graph}

An entity, such as a VM, may have a set of properties defined by another model/schema, such as:
VirtualMachine (VM) {name (string), primaryIpAddress (string), hostName (string), memory (integer, unit=MB), number of CPUs (integer), power status (binary), routing configuration (string), DNS configuration (string), os (integer), vnics (Vnic)}.

The NIC object in model/schema 119 may have a set of properties defined by another model/schema, such as:
VNIC {MTU, IP addresses, NICId, operational status, speed, duplex type}.

Model/schemas 119 are used by the search engine for understanding types of entities, relationships between entities, and valid and invalid properties for entity objects. For example, a user may enter the query: FIND VMs WITH NO VNICS. The search engine uses model/schema 119 to understand that a VM has an array of entries referred to as VNICs and the VNIC entry must be empty to satisfy the query.

In another example, the user may enter the query: HOSTs IN 192.168.1.1/16. The query intent is to find hosts whose IP address in 192.168.*.* (where * is don't care operator). The search engine uses model/schemas 119 to identify where the IP address is stored in a host object.

Figure 8:
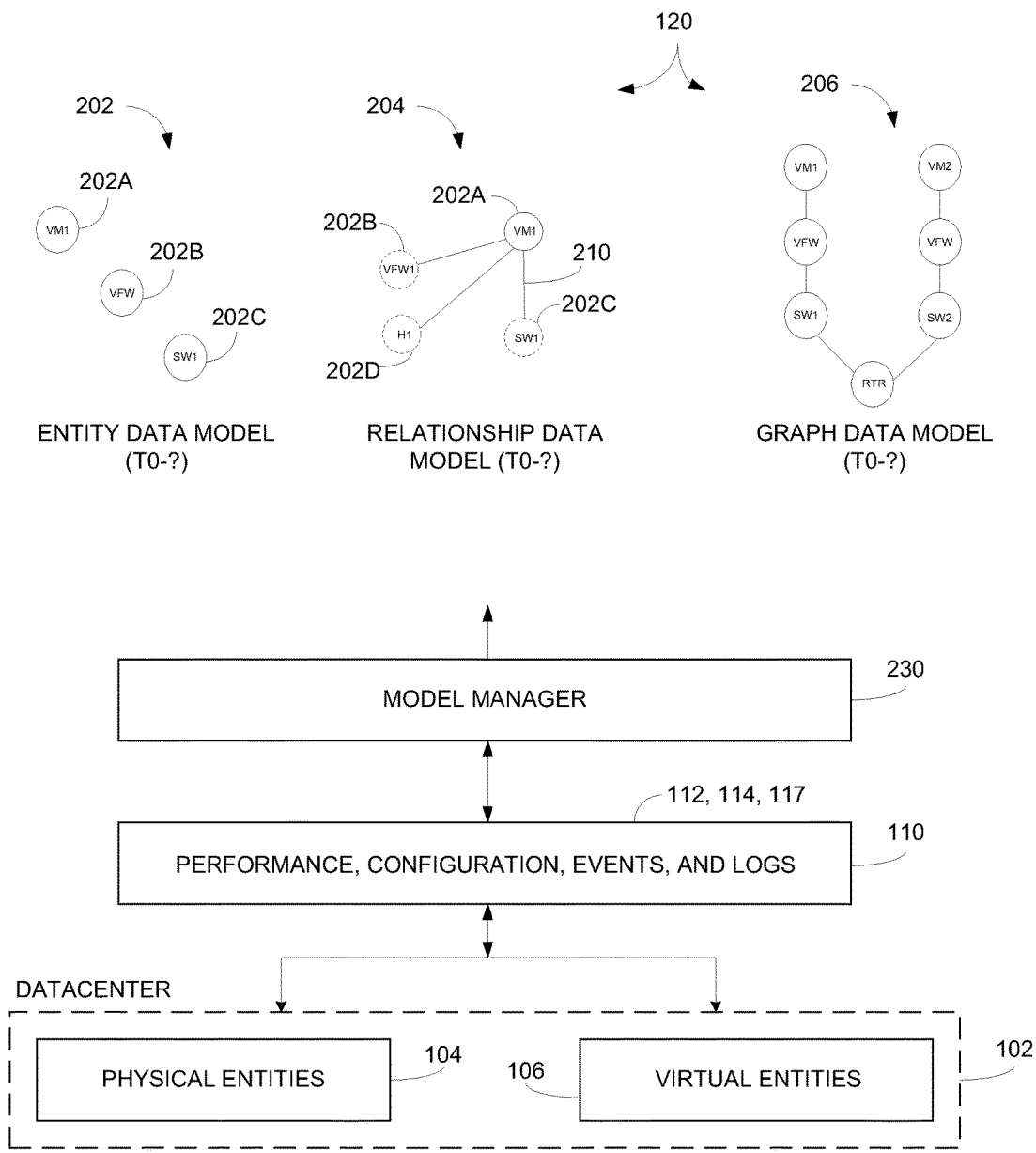
FIG. 8 depicts example data models used by the management system.

FIG. 8 depicts example of data models 120 used in network 200 of FIG. 6. Data models 120 are alternatively referred to as a data schema or storage schema. Data models 120 may include different entity data models 202, relationship data models 204, and graph data models 206. Entity data models 202 contains or identify the performance and configuration data for different physical and virtual entities, such as hosts, virtual machines, virtual firewalls, switches, routers, or the like, or any combination thereof. For example, an entity data model 202A may represent the data for a virtual machine VM1, entity data model 202B may represent the data for virtual firewall VFW, and entity data model 202C may represent the data for switch SW1.

Entity data models 202 are bound together by one or more relationship data models 204. Relationship data models 204 are collections of layer 1 entity data models 202 combining properties, configurations, and relationships between the different entities. Relationship data models 204 may identify the physical and logical connections between different entities. For example, relationship model 204 may contain configuration data identifying relationships between entity data model 202A for VM1 and entity data model 202B for virtual firewall VFW, entity data model 202D for HOST1 (FIG. 6), and entity data model 202C for switch SW1.

Graph data models 206 contain configuration data that identify logical relationships and/or networks established between entities and are used for monitoring the communications and topology between different entities in different locations in the datacenter, such a communication path between VM1 and VM2. Graph data models 206 enable high level topology and connectivity analysis and are traversed in various ways to detect configuration inconsistencies such as a MTU mismatch or a VTEP missing condition. Examples graph data models 206 may include, but are not limited to, VXLAN networks, layer 2 networks, and layer 3 logical networks. In some instances, model manager 230 dynamically generates graph data models 206 in response to user configuration events. For example, a user may configure a VXLAN. Model manager 230 may detect the entities and entity ports configured for the VXLAN and dynamically generate an associated graph data model 206.

Data models 120 represent a domain abstraction for the software defined datacenter and can be mapped from the various vendor models and optimized for depicting aspects of the domain. Data models 120 are used for generating model driven analytics that drive troubleshooting in datacenter 102. Model driven analytics can identify configuration inconsistencies which are not typically used for driving anomaly detection/troubleshooting in datacenters.

Data models 120 are flexible in terms of the various data facets it captures as well as the form in which model data is consumed. Some data models 120 may include runtime objects that capture runtime data and represent entities with frequently changing properties, such as an address resolution protocol (ARP) table within a NIC or a media access control (MAC) table within a switch.

Data models 120 are also used for capturing and processing vendor, canonical, and user driven events. Lower level events may have simple rules for detection, such as a configuration property inconsistency, while higher level events may look at number of occurrences, multiple events etc.

Data collection proxies may store data from physical entities 104 and virtual entities 106 as vendor data. The vendor data may be mapped to canonical data and stored as canonical models. Model manager 230 may use the vendor data for computing logical domain objects, such as layer 2 models, layer 3 models, etc.

The data collection proxies periodically monitor and store performance data 112 and events and log data 117 associated with data models 120, such as CPU and memory utilization. The proxies also aperiodically detect and store configuration data 114 for the data models 120, such as a change in the number of assigned CPUs and memory. Data models 120 are linked to the performance data 112 and configuration data 114. For example, identifiers in data models 120 include keys or links to the stored performance and configuration data for the associated network entity. The search engine generates search instructions based on received search queries that access the data 112, 114, and 117 associated with data models 120.

Figure 9:
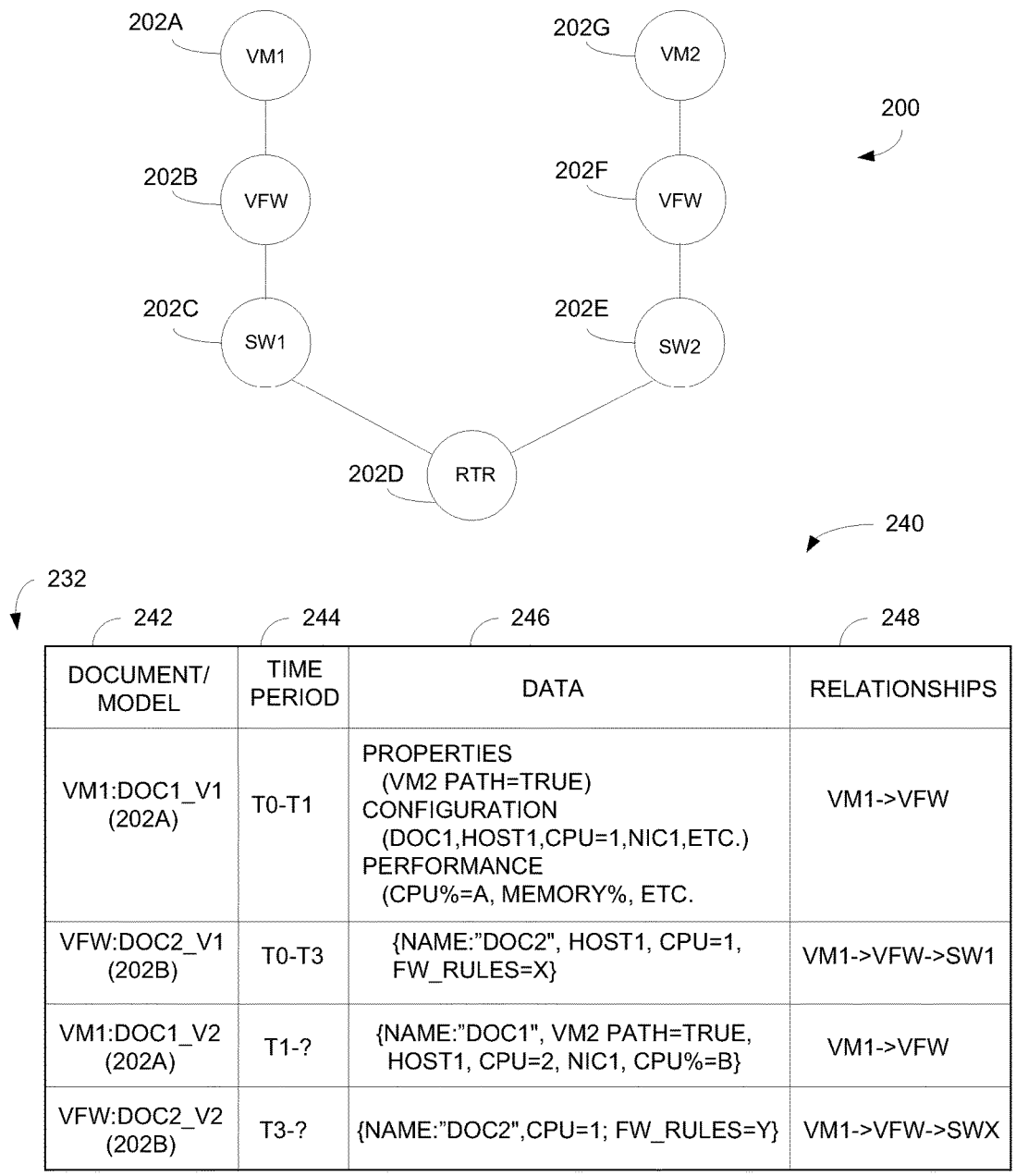
FIG. 9 depicts example documents generated by the management system.

FIG. 9 depicts an example table 240 containing different documents (DOCs) 232 associated with data models 202. Table 240 is a logical representation used for explanation purposes. Different versions of documents 232, data models 202, and associated data may be stored in different tables and different storage locations. Some documents 232 and data models 202 may not actually contain the data described below, but may contain links or identifiers to other tables that contain the associated data.

Model manager 230 in FIG. 8 may generate different versions of documents 232 based on different events associated with the data models 202. A first document version (V1) may extend up to the time of an identified event. The model manager may generate a second version (V2) of a document 232 in response to the identified event and extend the time period for the second version V2 of the document indefinitely until another event is identified. This time stamping process converts periodic and aperiodic data into a time series that can more effectively monitor, identify, and visualize datacenter information.

To explain in more detail, first version V1 of document DOC1 is associated with data model 202A for virtual machine VM1. Document DOC1 is assigned an identifier DOC1_V1 in column 242 of table 240 and assigned a starting time T0 in column 244 of table 240. Data associated with data model 202A is stored in one or more columns 246 of document DOC1_V1. For example, data model 202A may identify properties for VM1, such as a network path to VM2. In this example, the VM2 network path is set to TRUE indicating the network path is operational.

Document DOC1_V1 may contain configuration data in column 246 that identifies the host for VM1 and the number of CPUs, NICs, etc. for VM1. Column 246 also may include performance data for VM1, such as memory and CPU utilization, dropped packets, etc. Column 248 of document DOC1_V1 may identify relationships for VM1. For example, VM1 is identified as connected to virtual firewall VFW. As mentioned above, these are logical representations of different properties, configuration data, performance data, and relationships that a data model 202 and associated document DOC may contain or identify for an associated entity.

A first version V1 of a second document (DOC2) is generated for the data model 202B associated with virtual firewall VFW and is assigned an identifier VFW:DOC2_V1 in column 242. Document DOC2_V1 is also assigned a starting time stamp T0 in column 244. Data in column 246 identifies VFW as located in Host1, having a number of CPUs=1, and containing firewall rules FW_RULES=X for transmitting and/or dropping packets. Relationships in column 248 identify VFW as connected with VM1 and SW1.

At time T1, the management system detects an event associated with model VM1. For example, CPU utilization by VM1 may increase over some predefined threshold. In response to the detected high CPU utilization at time T1, model manager 230 in FIG. 9 generates a second version V2 of document DOC1. The first document version DOC1_V1 is assigned an ending time of T1 in column 244 and the second document version DOC1_V2 is assigned a starting time of T1 in column 244.

After time T1, the model manager stores or links data for VM1 with document version DOC1_V2. Table 240 now contains a time series for VM1 that starts with document version DOC1_V1 for time period T0-T1 and continues with document version DOC1_V2 for a time period that starts at time T1 and extends to some yet to be determined ending time.

In response to a rule change in virtual firewall VFW at time T3, the model manager generates a second document version DOC2_V2. The first document version DOC2_V1 is assigned an ending time of T3 in column 244 and the second document version DOC2_V2 is assigned a starting time of T3 in column 244. The model manager now stores or links new data associated with VFW with second document version DOC2_V2. Table 240 now contains time series data for an aperiodic rule change associated with VFW that starts with first document version DOC2_V1 for time period T0-T3 and continues with second document version DOC2_V2 with for a time period that starts at T3 and extends to a yet to be determined ending time.

Table 240 now contains time series data that identifies precise times when rules were changed in virtual firewall VFW. The rule change can be correlated with other performance or configuration data in the datacenter. For example, the user or search engine may correlate the aperiodic rule change at time T3 for VFW with periodically monitored performance data, such as the percentage of packet drops between VM1 and VM2.

Model manager 230 (FIG. 8) may create new document versions in response to any event. For example, the model manager may create a new document version in response to a reconfiguration of a switch, load balancer, VM, or any other entity in the datacenter. The model manager also may create new document versions in response to a relationship or network reconfiguration, such as a VM moving from one physical host to another physical host or a new entity added to or removed from network 200.

Figure 10:
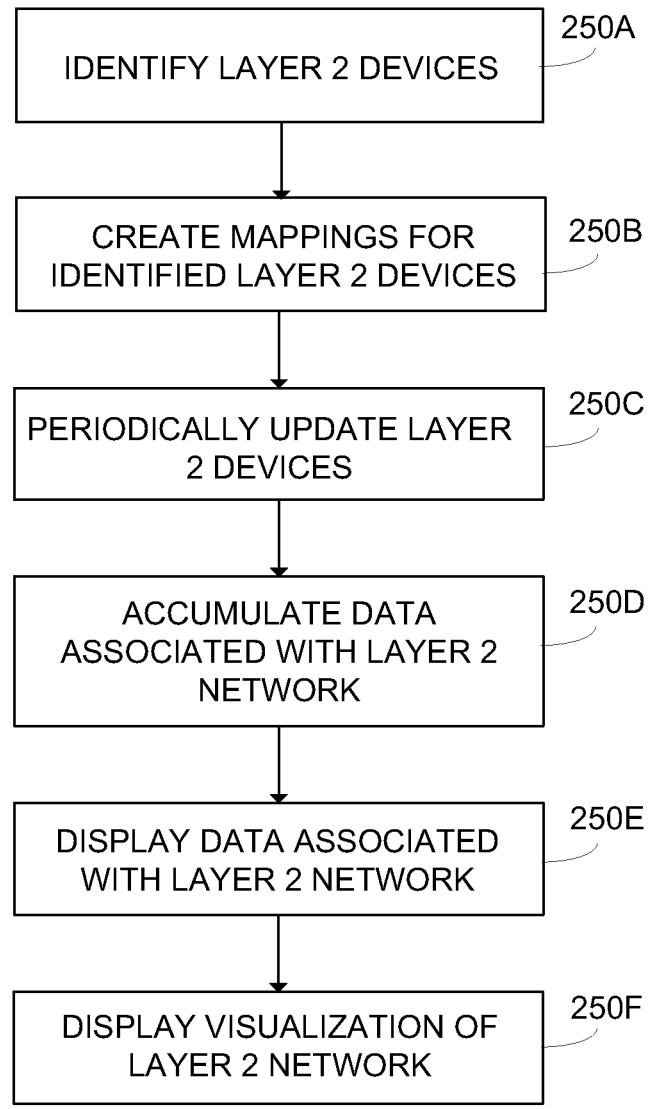
FIG. 10 depicts an example process for generating a layer 2 network model.

FIG. 10 shows an example of how model manager 230 automatically creates graph models 206 in FIG. 8, such as a layer 2 network model. In operation 250A, the model manager identifies layer 2 devices in the datacenter, such as switches, and adds the devices to an inventory. For example, users may register layer 2 devices or the model manager may discover the layer 2 devices via device configuration files.

In operation 250B, the model manager creates mappings for each virtual/physical switching device in the inventory. For example, a mapping is created for each VMWare® distributed virtual switch and for each Cisco® physical switch. The mappings are created for port/port groups. Mappings are created between identified layer 2 devices and layer 2 identifiers for all VLANs, VxLANs, or any other overlay and underlay layer 2 technologies associated with the port. A VLAN Id mapping is created for a VLAN and a segment Id mapping is created for a VxLAN.

The mapping may be referred to as a DeviceL2Switch and defined by a tuple comprising the device identifier, layer 2 identifier (VLAN, VxLAN etc.), and optionally the port group (in the virtual switch case). The DeviceL2Switch is a layer 2 slice of the switch for the identified device in question. The DeviceL2Switch is modeled as a switching entity and is a powerful representation of layer 2 connectivity which models a connectivity path at the layer 2 level across physical and virtual boundaries.

For example, a switch referred to as Device 1 may include two ports. A first port eth100/1/1 may connect to VLANS 212, 213 and a second port eth100/1/2 may connect to VLAN 211. The user or model manager may create three DeviceL2Switch entities associated switch ports. A first Device 1 for DeviceL2Switch is associated with VLAN 212, a second Device 1 is associated with VLAN 213, and a third Device 1 is associated with VLAN 211. The model manager associates the first and second Devices 1 with eth100/1/1 port and associates the third Device 1 with eth100/1/2.

For each port/port group, the model manager records the connected numbered network interfaces, such as VNICS for virtual machines and physical NICS for physical machines. These are indirectly associated with the DeviceL2Switch.

In operation 250C, the model manager periodically updates the layer 2 network devices. For example, the model manager may aggregate DeviceL2Switches with the same layer 2 identifier (VLAN, VxLAN etc.) and create distinct logical layer 2 network entities which are primarily identified by the layer 2 identifier. The model manager also may compute different properties of the layer 2 network entity using various techniques. For example, the model manager may derive network addresses from the aggregation of the numbered network interfaces with all associated DeviceL2Switches and ports.

Operation 250D accumulates data associated with the different devices in the layer 2 network. For example, analytics engine 122 (FIG. 1) may monitor and calculate packet rates, packet drops, memory utilization, CPU utilization, or the like, or any combination thereof, specifically associated with the layer 2 network.

Operation 250E may display data associated with the layer 2 network and operation 250F may display a visualization of the layer 2 network. For example, the search engine may identify and display performance and configuration data for the layer 2 network and/or the entities in the layer 2 network in response to a search query. In another example, the analytics engine, model manager and/or search engine may periodically and/or automatically monitor and identify information related to the layer 2 network and display certain events to the user, such as a layer 2 network failure. In operation 250E, the visualization manager may display a topology for the layer 2 network and any associated endpoints. The visualization manager also may visually display any events associated with the topology.

Figure 11:
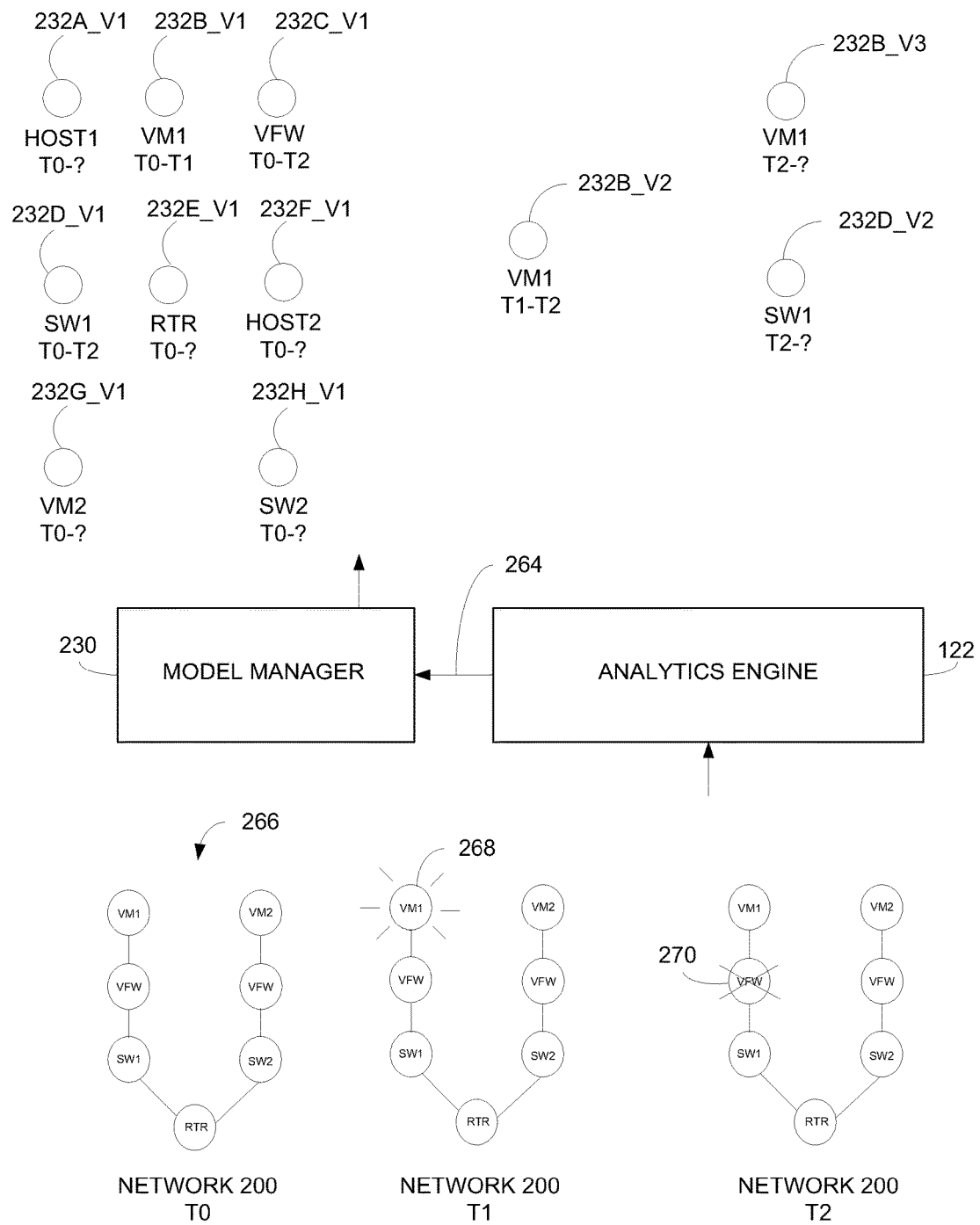
FIG. 11 depicts how documents and data models are dynamically updated.

FIG. 11 depicts another example of how analytics engine 122 and model manager 230 update data models and/or data model documents. At time T0 network 200 is operating in a first state 266. Model manager 230 generates a set or version V1 of documents 232 containing data models for the entities in network 200. Model manager 230 may have generated documents 232 and the associated data models either automatically or via user configuration.

Analytics engine 122 or the data models may identify events associated with the entities in network 200. As mentioned above, the events may be related to any performance, configuration, relationship, property, etc. for any entity in network 200. In this example, analytics engine 122 detects an event 268 at time T1 associated with VM1. In one example, event 268 indicates VM1 increased CPU utilization above a predetermined threshold.

Event 268 is relayed to model manager 230. Model manager 230 generates a second document version 232B_V2 for data model VM1. Model manager 230 assigns an ending timestamp T1 to the first document version 232B_V1 and assigns a starting timestamp T1 to second document version 232B_V2. Model manager 230 may associate subsequent data for virtual machine model VM1 with document version 232B_V2.

Event 268 might not affect other entities in network 200. Therefore, model manager 230 may continue to associate performance and configuration data for the unaffected entities in network 200 with existing first document versions 232_V1. For example, analytics engine 122 may continue to accumulate performance data for virtual machine VM2 and associate the performance data with document 232G_V1. Document version 232G_V1 has a starting timestamp T0 and a currently open-ended ending timestamp.

At a next time T2, analytics engine 122 detects another event 270 that reconfigures network 200 by removing virtual firewall VFW. Model manager 230 determines the relationships have changed for entities VM1 and SW1 and generates new document versions 232B_V3 and 262D_V2, respectively. Model manager 230 also assigns an ending timestamp T2 to the second version of document 232B_V2 and the first version of document 232D V1.

New document versions 232B_V3 and 232D_V2 are assigned starting timestamps T2 corresponding to the detection of event 270. The relationships for VM1 and SW1 in document versions 232B_V3 and 232D_V2, respectively, no longer include connections to VFW. For example, the new relationships may identify VM1 connected directly to SW1.

Other entities may or may not be affected by events 268 or 270. For example, model manager 230 may determine that the removal of VFW does not affect configuration data in the model for VM2. Therefore, model manager 230 does not create a new version of document 232G. However, at a later time, analytics engine 122 may detect a performance change associated with VM2, such as a substantial increase in CPU utilization due to a denial of service (DNS) attack. The increased CPU utilization may cause analytics engine 122 to send a trigger 264 to model manager 230. In response, model manager 230 may create a new document version 232G_V2 for VM2 with a starting time associated with the increased CPU utilization.

Analytics engine 122 constantly monitors the topology and communications between VM1 and VM2. Any changes in the topology or communications may trigger model manager 230 to create new document versions for the data models affected by the changes. For example, a change in the packet transmit/drop rules may cause a dramatic increase in the number of packets dropped by virtual firewall VFW. Model manager 230 may create a new version of document 232C in response to the rule change.

Model manager 230 also may identify the performance and configuration data most important to network 200. For example, virtual firewall VFW may have hundreds of packet transmit/drop rules. However, only a small subset of rules may be associated with communications between virtual machines VM1 and VM2. Analytics engines 122 may only monitor for changes in the subset of packet drop rules in VFW associated with communications between VM1 and VM2 in network 200. Analytics engine 122 might not create a new version of document 232C for other rule changes in VFW. In another example, analytics engine 122 also may only monitor a subset of routing tables in router RTR that impact VM1 and VM2 or other entities within network 200.

In another example, the relevant context for virtual firewall VFW may comprise endpoints VM1 and VM2 and the network interfaces involved in the network path between VM1 and VM2. Model manager 230 identifies the security groups where endpoints VM1 and VM2 are members. The security groups can be defined at various levels, such as VM, network interface, subnet etc. The rules that refer to these security groups are identified and filtered based on the packet flows that are running on the relevant endpoints, such as Hyper-Text Transfer Protocol (HTTP). The above referenced data modeling scheme is highly scalable since model manager 230 only needs to generate new versions of documents 232 for the data models affected by detected events.

Analytics engine 122 comprises a suite of programs that generate triggers 264 that determine when model manager 230 generates new document versions or updates data models. Triggers 264 may include scheduled triggers that execute on a periodic basis or aperiodic triggers that execute based on events, such as changes in the model configuration data. Analytics engine 122 also may generate triggers 264 for lower level events, such as when a VM moves from one host to another host. Analytics engine 122 also may generate triggers 264 in response to data model additions, updates, or deletions within network 200. Analytics engine 122 also may generate ad-hoc triggers 264 in response to user actions or inputs. Analytics engine 122 also may generate triggers 264 based on events raised by third party programs and vendor systems, such as events associated with alarms or health checks.

Analytics engine 122 may detect configuration inconsistencies using the data models 120 in FIG. 8. For example, analytics engine 122 may detect a speed/MTU mismatch across NICs, switch ports, router NICs, etc. Analytics engine 122 also may detect events associated with the topology of network 200. For example, analytics engine 122 may generate a trigger 264 in response to a missing VTEP or in response to IP addressing related layer 2 network problems. Analytics engine 122 also may confirm all node addresses in network 200 are in the same subnet as the layer 2 subnet or confirm all nodes in network 200 have the same gateway and point to an IP address for the same router.

Analytics engine 122 also may check for configuration and runtime inconsistencies such as inconsistent server and router ARP entries, network black holes, and valid ARP entries across layer 2 MAC addresses. Analytics engine 122 may monitor data from any variety of sources, such as programs/vendor systems and use the data to detect higher level events. Analytics engine 122 may also take into account user feedback from search queries and other user inputs for troubleshooting network 200.

Figure 12:
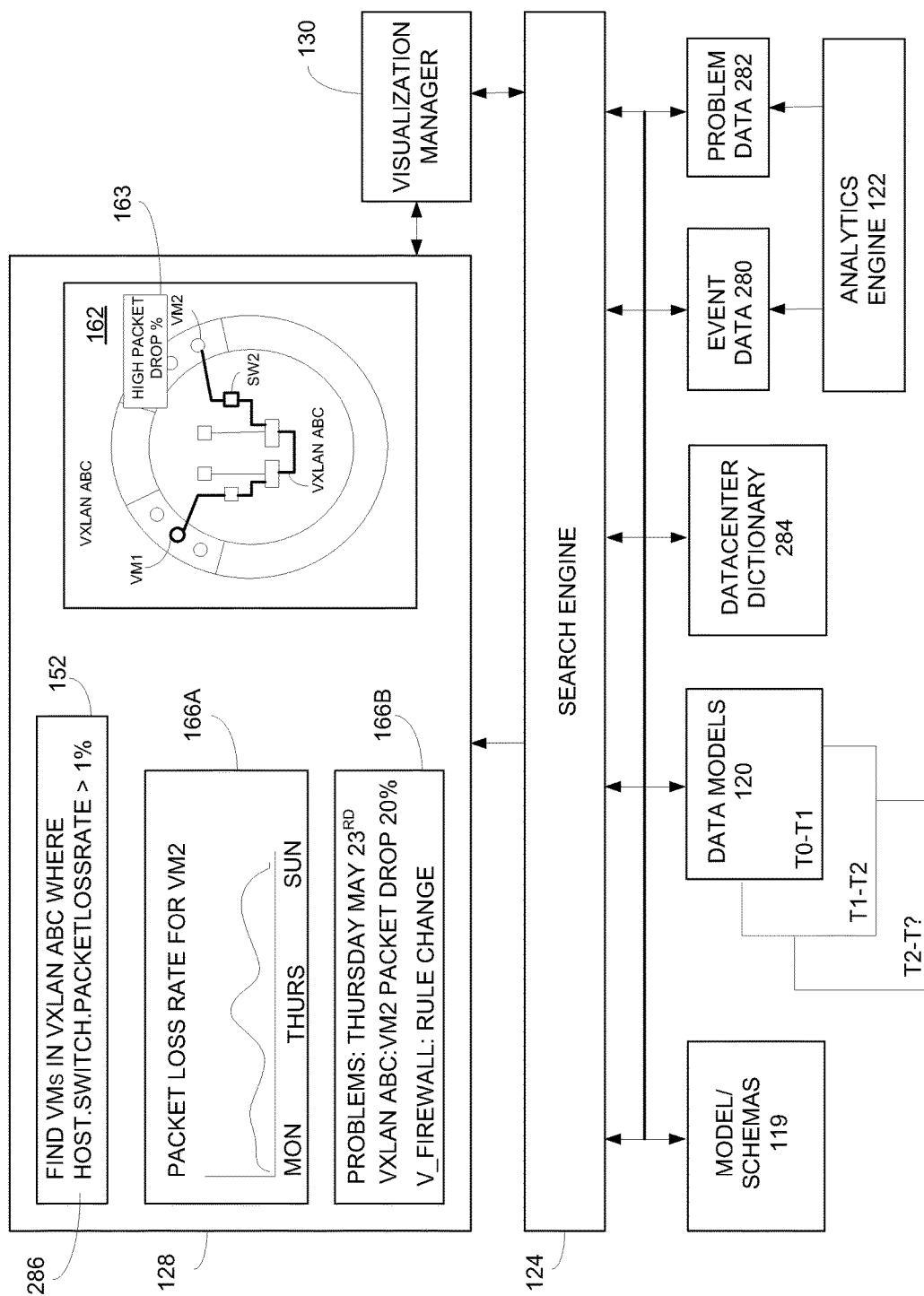
FIG. 12 depicts an example of how a search engine uses a model/schema and data models for generating search results.

FIG. 12 shows in more detail how search engine 124 formulates searches in response to search requests. Search engine 124 identifies the intent of the search query by leveraging the relationships and the properties in model/schemas 119 and a datacenter dictionary 284. Search engine 124 then uses data models 120 to create execution instructions. The execution instructions return data from data models 120 responsive to the search query. Visualization manager 130 then visualizes the returned data associated with the intent.

In one example, a user enters the following search query 286 into search field 152:

FIND VMS IN VXLAN ABC WHERE HOST.SWITCH.PACKETLOSSRATE>1%. The intent of search query 286 is to identify VMs in a VXLAN network where packet loss between a host containing the VM and a switch connected to the host is over 1 percent.

Search engine 124 refers to data dictionary 284 and model/schemas 119 to identify the intent of search query 286. Datacenter dictionary 284 may contain different keywords and sentence structures and grammar that search engine 124 uses to understand search query 286. For example, datacenter dictionary 284 identifies VM as a noun for a type of virtual machine.

Search engine 124 uses model/schemas 119 to further understand VMs are entities contained within hosts; VXLANs contain VMs, hosts, and switches; hosts are connected to switches; and connections between hosts and switches have a property associated with a packet loss rate.

Search engine 124 uses datacenter dictionary 284 and model/schemas 119 to understand search query 286 is requesting information about a type of object VM in the datacenter and that VXLAN, HOST, and SWITCH are other types of objects in the datacenter, that ABC is a name of object VXLAN, and that PACKETLOSSRATE and ">" are operators in the search query.

Search engine 124 also understands from datacenter dictionary 284 and model/schemas 119 that the WHERE keyword indicates that hosts need to be identified corresponding to the VMs, switches need to be identified corresponding to the hosts, and performance data identified as PACKETLOSSRATE needs to be calculated for the identified hosts and switches.

Search engine 124 may include algorithms that generate scripts for accessing data models 120. For example, search engine 124 may generate the following database query for extracting data from tables and any other associated event data 280 and problem data 282 associated with data models 120.

1. Find VXLAN (network) named ABC
2. Find VMs belonging to entities in step (1)
3. For each VM computed in step 2, traverse to their host, traverse to switch connected to host, and compute packet loss rate and compare with 0.01

Operation 1 finds any VXLANs having the name ABC contained in data models 120. Operation 2 identifies the VMs contained in VXLAN ABC. Operation 3 identifies the host for each VM identified in operation 2, identifies the switch connected to the host, and then computes the packet loss rate between the host and the identified switch. Operation 3 then identifies any of the VMs having an associated host switch connection with a packet loss rate greater than 1%.

Visualization manager 130 visualizes the search results based on the intent of search query 286. For example, the intent indicates the user wants to visual VMs associated with high packet loss rate. According, visualization manager 130 may display a graph in section 166A showing the packet loss for VMs over time. Visualization manager 130 also may display text in screen section 166B identifying times and amounts of the largest packet drop rates. Visualization manager 130 also may display topology 162 for VXLAN ABC and highlight a high packet drop rate problem as notice 163 in topology 162.

Search engine 124 may identify other events 280 associated with VXLAN ABC or associated with the high packet drop rate. For example, search engine 124 may identify a rule change in a virtual firewall just prior to the packet drop problem. Visualization manager 130 may display the rule change for the VFW in screen section 166B. The time related rule change may provide further insight into the packet drop problem associated with VM2.

The data collection proxies continuously collect data associated with the different entities in VXLAN ABC. Analytics engine 122 continuously analyzes the performance and configuration data associated with data models 120.

For example, data models 120, event data 280, and problem data 282 may include CPU and memory utilization, firewall rule changes, packet processing values, port configurations, etc. for any entities within VXLAN ABC. Analytics engine 122 analyzes the collected data and identifies any events 280 or problem data 282 associated with VXLAN ABC or any of the associated entities. For example, analytics engine 122 may automatically identify excessive CPU bandwidth utilization, or a port mismatch between entities that prevent proper packet switching within VXLAN ABC.

Analytics engine 122 comprises pieces of executable code and operates on the content in data models 120 detecting various conditions, such as inconsistencies in configuration data, runtime data, and raising events. Analytics engine 122 stores and maps vendor data to canonical data and uses data models 120 for providing visibility into VXLAN ABC. Analytics engine 122 checks basic and advanced connectivity, such as routing rules, access control lists (ACLs), etc. between VM's. Analytic engine 122 consumes model objects/events and produces model objects/events, such as problem data 282. Search engine 124 can then identify interesting event data 280 associated with into VXLAN ABC. For example, search engine 124 may identify the current CPU utilization information for different entities within logical network ABC.

As explained above, data models 120, event data 280 and problem data 282 are captured in a time series format. This allows search engine 124 to interpret time instants or time ranges within a search query and execute the query over specified time intervals. The time series format also allows search engine 124 to troubleshoot problems by performing historical natural language based search queries based not only on user selected time periods but also based on associated events 280 and/or problems 282.

Search engine 124 links related periodic and aperiodic time series data, or may dynamically create data for time based search queries. For example, a user may enter the search term FIND VMS WITH CPU>2 AT 9 AM YESTERDAY. Search engine 124 generates search instructions that access the data models 120 associated with VMs and outputs configuration data identifying the number of CPUs. As explained above, data models 120 are stored as documents that have associated time periods. The search instructions access the documents for VM data with time periods covering 9 AM yesterday and identify VM models with configuration data indicating more than two CPUs.

Other example queries may include, but is not limited to, the following:
1. FIND ALL VXLANS
2. FIND VXLAN 'ABC'
3. TROUBLESHOOT VM256
4. FIND PROBLEMS BETWEEN 3 PM YESTERDAY AND TODAY 4 PM
5. SHOW NSXCONTROLLER WHERE UTILIZATION>90% TODAY
6. LIST HOSTS WITH PROBLEMS
7. VMS IN VXLAN ABC
8. SWITCHES WITH PROBLEMS
9. PERFORMANCE OF VM WEBSERVER1

Figure 13:
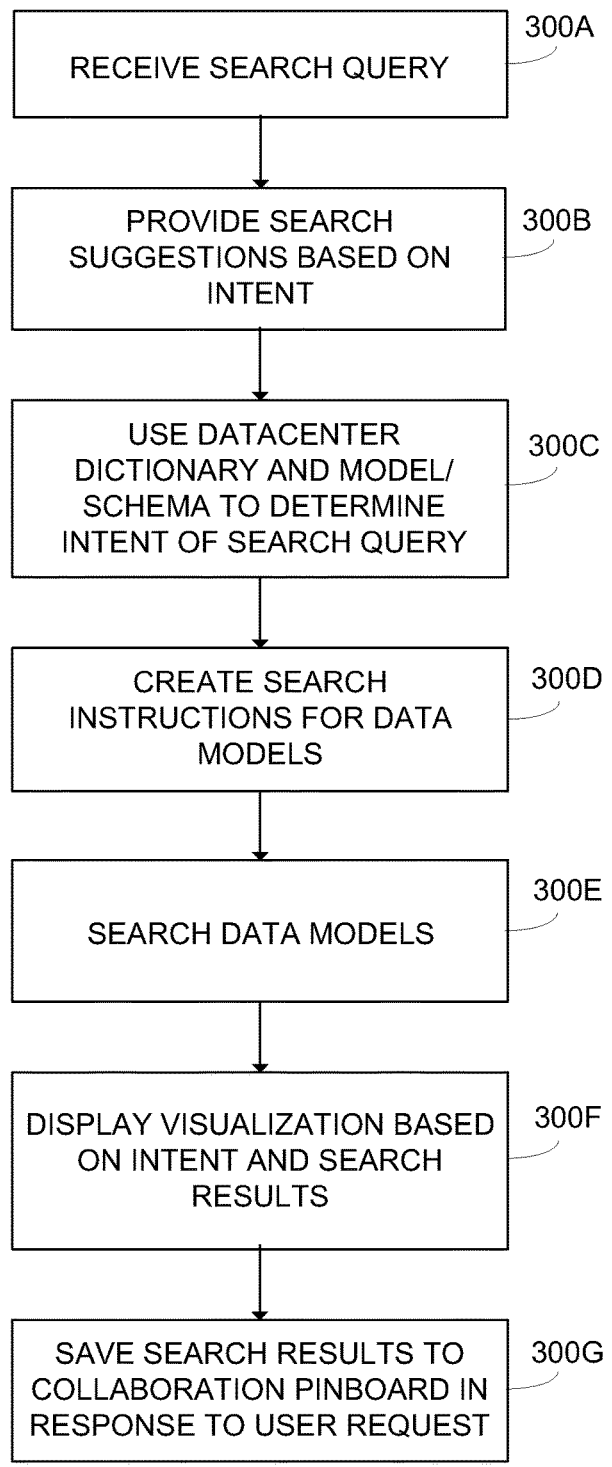
FIG. 13 depicts an example process for searching and visualizing information in a datacenter context.

FIG. 13 depicts one example of how the search engine provides datacenter contextual search results. Referring to FIGS. 12 and 13, the search engine in operation 300A receives a search query. Again, the search query may be based on a text input into a search field or may comprise selection of elements within a displayed topology.

Operation 300B may display search suggestions based on keywords in the search query. For example, based on the keyword TROUBLESHOOT, the search engine may display a set of search suggestions that identify different types of networks and entities associated with possible performance problems. If problem data exists, the search engine may display suggestions for the particular networks and network entities that are associated with the current or previous problems.

In operation 300B, the search engine uses the datacenter dictionary and the model/schema to determine the intent of the search query. For example, the search query may include the keyword TROUBLESHOOT LOGICAL NETWORK ABC. In this example, the search engine determines via the datacenter dictionary that the query intent is to identify past or present problems with logical network ABC.

The search engine identifies any time periods associated with the search query. For example, the search query may include a specific time period, such as a time of day, day, year, etc. In another example, the user may select the time slider previously shown in FIG. 4. If no time period is explicitly selected, the search engine may assume a time period, such as the current hour and day. The search engine may also assume the time period based on the search query intent. For example, if a user enters the search term TROUBLESHOOT LOGICAL NETWORK ABC, the search engine may assume the search should progress from a current day back in time to identify any problem data associated with the logical network ABC.

Operation 300D generates instructions based on the intent for searching the data models. The instructions may be scripts identifying data entity names, relationships, and parameters in the data models. Operation 300E uses the instructions to search the data models. As explained above, the execution scripts may identify data associated with particular time periods.

Operation 300F displays a visualization of the topology, entities, and data associated with the search results. For example, the visualization manager displays the topology for a network identified in the search query and identifies elements within the topology of the network. The visualization manager may display other related information, such as any configuration changes or events associated with the entities in the network.

Operation 300G may save the search results to a collaboration pinboard in response to a user request. As mentioned above a user may select an icon for saving search results to a pinboard. The collaboration manager may copy the currently displayed data into a collaboration database. The user may then link other users to the collaboration database.

Predicate Pushdown

The management system performs unique predicate pushdowns that convert a join into a union. This enables access to relationships between objects (perform object traversal). For example, the search term FIND VMS WHERE SWITCH.CPUUTIL>90% may find virtual machines with a connected switch experiencing CPU over use.

The management system can also compute predicates on time series and scalars. For example, the search term FIND VMS WHERE AVERAGE (PACKETSLOST/(PACKETSSENT+PACKETSRECVD))>1% YESTERDAY finds machines where packet loss exceeds 1%, averaged over yesterday. Users can also run persistent queries for creating alerts.

Dynamic programming combines multiple smaller parsers. The smaller parsers are based on CFG (which isn't LALR (k) or LA (k) or LL (k)). For example, a user may enter the query: FIND MACHINES WHICH HAVE CPU COUNT>2 OR CPU UTILIZATION>80% TODAY. Data may consist of all performance data joined with each (multiple versions of) configuration state. The relational algebra equivalence would be a series of self joins on configuration data joined with performance data. The management system may convert this "join" to a union with appropriate predicate pushdown.

For example, consider the following:
  select * from A join B on A.id=B.id where A.a2=x OR B.b2=y.
Normally disjuncts (ORs) are not pushed down. The following equation is not equivalent to the one above:
  select * from (select * from A where A.a2=x) as A'JOIN (select * from B where B.b2=y) as B' on A'.a=B'.b.
This is because pre-filtering A might prevent some tuples which would have otherwise joined with B, where B.b2=y. The A and B elements comprise a configuration store and a metric store. The management system uses domain knowledge that the join condition comprises a one to one correspondence between rows of A and B barring timestamps.

Therefore the elements can be written as:
WITH select id from (select * from A where A.a2=x) as A' UNION (select * from B where B.b2=y) as B' on A'.id=B'.id AS T1 select * from (select * from A JOIN B on A.id=B.id) as M JOIN t1 on M.id=t1.id;

Thus, the management system obtains an identifier from A that satisfies predicate on A.a2. The identifier is then unioned with the identifiers from B that satisfy predicate on B.b2. Then the management system fetches any other attributes required for identifiers in this identifier set. In general, this is valid when the two tables being joined have the same primary key.

Figure 14:
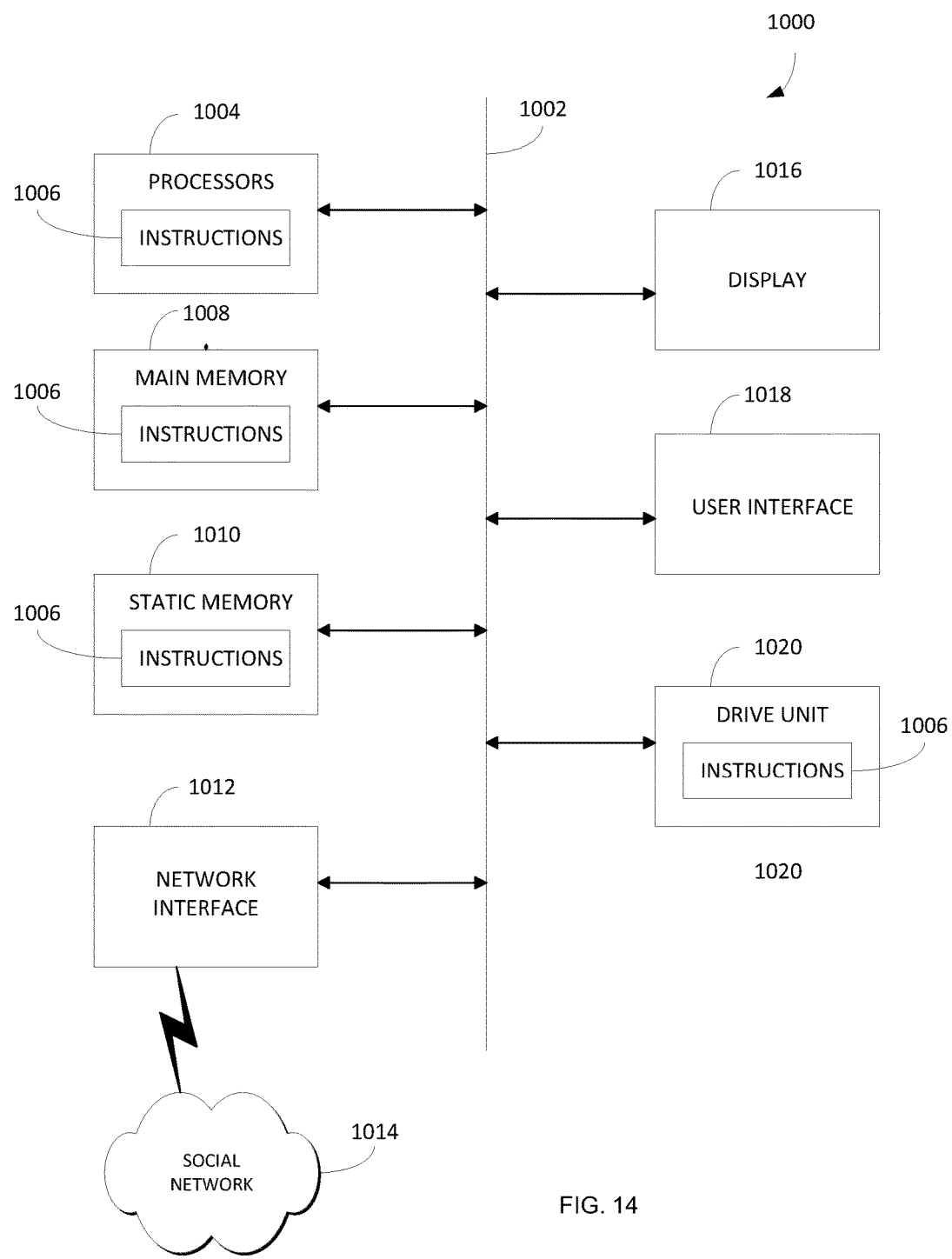
FIG. 14 depicts an example computing device for implementing the datacenter management system.

FIG. 14 shows a computing device 1000 that may be used for operating the datacenter management system and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
   receiving, by the computing device, a natural language based search query including a phrase or an abbreviation for information associated with managing operation of a datacenter;
   identifying, by the computing device, physical connections and hierarchal relationships of physical entities of the datacenter relevant to the natural language based search query;
   identifying, by the computing device, hierarchal relationships of virtual entities of the datacenter relevant to the natural language based search query;
   identifying, by the computing device, an intent of the natural language based search query based on the phrase or the abbreviation and the identified physical connections and hierarchal relationships of the physical entities and the identified hierarchal relationships of the virtual entities;
   performing a natural language based search, by the computing device, of data pertaining to operation of the data center based on the intent of the natural language based search query; and
   generating results of the search other than results from a keyword based search.

2. The method of claim 1, further comprising storing, by the computing device, configuration data and performance data associated with the physical entities and the virtual entities.

3. The method of claim 2, further comprising:
   converting the configuration data and the performance data associated with aperiodic events into a time series; and
   combining the configuration data and the performance data associated with the aperiodic events with the configuration data and the performance data associated with periodic events.

4. The method of claim 3, wherein converting the data associated with aperiodic events into a time series comprises:
   generating a first document version for the configuration data and the performance data; and
   generating a second document version for the configuration data and the performance data in response to one of the aperiodic events.

5. The method of claim 1, further comprising:
   providing, by the computing device, a datacenter dictionary containing keywords, sentence structures, and grammar associated with the datacenter, wherein the grammar associates an abbreviation with a part of speech including a noun or a verb; and
   identifying, by the computing device, the intent of the natural language based search query based on the datacenter dictionary.

6. The method of claim 1, further comprising:
   identifying, by the computing device, a network configured in the datacenter; and
   visualizing, by the computing device, a topology for the network.

7. The method of claim 6, wherein visualizing the topology includes displaying a series of layers representing at least one of the physical entities and the virtual entities associated with the network.

8. The method of claim 1, wherein the results of the search include a state of a network, and
   wherein the method further comprises:
      storing, by the computing device, the state of the network in a collaboration database; and
      enabling, by the computing device, access and manipulation of the state of the network by different users.

9. The method of claim 1, further comprising:
   identifying, by the computing device, a network associated with the datacenter;
   identifying, by the computing device, two of the physical entities associated with the network;

identifying, by the computing device, ports associated with the two of the physical entities associated with the network; and identifying, by the computing device, mismatches between the ports.

10. An apparatus, comprising:

a processing device configured to:
- associate configuration data and performance data for physical entities and virtual entities of a datacenter;
- receive a natural language based search query including a phrase or an abbreviation for information associated with managing operation of the datacenter;
- identify physical connections and hierarchal relationships of physical entities of the datacenter relevant to the natural language based search query;
- identify hierarchal relationships of virtual entities of the datacenter relevant to the natural language based search query;
- identify an intent of the natural language based search query based on the phrase or the abbreviation and the identified physical connections and hierarchal relationships of the physical entities and the identified hierarchal relationships of the virtual entities;
- generate an execution plan for searching the configuration data and the performance data based on the based on the intent of the natural language based search query; and
- generate results based on the execution plan other than results from a keyword based search.

11. The apparatus of claim 10, wherein the processing device is further configured to:
- periodically extract at least some of the performance data for the physical entities and the virtual entities; and
- aperiodically extract changes in the configuration data from the physical entities and the virtual entities.

12. The apparatus of claim 11, wherein the processing device is further configured to convert the periodically extracted performance data and aperiodic changes in the configuration data into time-series data.

13. The apparatus of claim 10, wherein the processing device is further configured to:
- generate a first document version for the configuration data and performance data associated with a first one of the physical entities or the virtual entities;
- detect an event associated with the performance data and/or configuration data for the first one of the physical entities or the virtual entities;
- associate a first time period with the first document version ending at a time associated with the event;
- generate a second document version for the configuration data and performance data associated with the first one of the physical entities or the virtual entities; and
- associate a second time period with the second document version starting at the time associated with the event.

14. The apparatus of claim 13, wherein the processing device is further configured to:
- identify a request time associated with the natural language based search query;
- compare request time with the first time period for the first document version;
- identify in the results the performance data and/or configuration data in the first document version based on an overlap of the request time with the first time period;
- compare the request time with the second time period for the second document version; and
- identify in the results the performance data and/or configuration data in the second document version based on an overlap of the search time with the second time period.

15. The apparatus of claim 10, wherein the processing device is further configured to visualize the results based on the execution plan.

16. A system, comprising:
- proxies configured to collect data for physical entities and virtual entities associated with a datacenter, wherein the data includes configuration data and performance data;
- a dictionary comprising keywords, sentence structures, and grammar associated with the datacenter, wherein the grammar associates an abbreviation with a part of speech including a noun or a verb; and
- a search engine configured to:
  - receive a natural language based search query including a phrase or an abbreviation for information associated with managing operation of the datacenter;
  - identify physical connections and hierarchal relationships of physical entities of the datacenter relevant to the natural language based search query;
  - identify hierarchal relationships of virtual entities of the datacenter relevant to the natural language based search query;
  - identify an intent of the natural language based search query based on the phrase or the abbreviation and the identified physical connections and hierarchal relationships of the physical entities and the identified hierarchal relationships of the virtual entities;
  - generate a search plan based on the natural language based search query, the phrase or the abbreviation, and the dictionary; and
  - generate results based on the search plan other than results from a keyword based search.

17. The system of claim 16, further comprising a model manager configured to convert periodic performance data for the physical entities and virtual entities and aperiodic configuration data for the physical entities and virtual entities into time-series data.

18. The system of claim 17, wherein the search engine is configured to identify a time period associated with the natural language based search query and identify the time-series data associated with the time period.

19. The system of claim 16, further comprising a visualization manager configured to visualize the results based on the search plan.

20. The system of claim 16, further comprising an analytics engine configured to identify anomalies and problems associated with the physical entities and the virtual entities based on the performance data, the configuration data, and/or models associated with the physical entities and the virtual entities.

21. The system of claim 20, further comprising a visualization manager configured to display the identified anomalies and problems within a topology showing a corresponding physical entity or virtual entity located in the datacenter.

22. An apparatus, comprising:

a processing device configured to:
- use a schema to identify relationships and properties for entities in a datacenter;
- use a data model to associate configuration data and performance data for the entities in the datacenter;
- receive a search query;
- generate an execution plan for searching the configuration data and performance data based on the schema and the data model;

generate a first document version for the configuration data and performance data associated with a first one of the entities;

detect an event associated with the performance data and/or configuration data for the first one of the entities;

associate a first time period with the first document version ending at a time associated with the event;

generate a second document version for the configuration data and performance data associated with the first one of the entities;

associate a second time period with the second document version starting at the time associated with the event;

identify a request time associated with the search query;

compare request time with the first time period for the first document version;

identify in search results the performance data and/or configuration data in the first document version based on an overlap of the request time with the first time period;

compare the request time with the second time period for the second document version; and identify in the search results the performance data and/or configuration data in the second document version based on an overlap of the search time with the second time period.

* * * * *